(12) United States Patent
Kozu

(10) Patent No.: US 10,302,965 B2
(45) Date of Patent: May 28, 2019

(54) PROGRESSIVE ADDITION LENS, DESIGN METHOD AND MANUFACTURING METHOD THEREFOR, AND PROGRESSIVE ADDITION LENS MANUFACTURING SYSTEM

(71) Applicant: Kazuma Kozu, Tokyo (JP)

(72) Inventor: Kazuma Kozu, Tokyo (JP)

(73) Assignee: HOYA LENS THAILAND LTD., Patumthani (TH)

( * ) Notice: Subject to any disclaimer, the term of this patent is extended or adjusted under 35 U.S.C. 154(b) by 137 days.

(21) Appl. No.: 15/301,214

(22) PCT Filed: Mar. 19, 2015

(86) PCT No.: PCT/JP2015/058260
§ 371 (c)(1),
(2) Date: Oct. 25, 2016

(87) PCT Pub. No.: WO2015/151837
PCT Pub. Date: Oct. 8, 2015

(65) Prior Publication Data
US 2017/0045757 A1 Feb. 16, 2017

(30) Foreign Application Priority Data
Mar. 31, 2014 (JP) ................. 2014-072856

(51) Int. Cl.
*G02C 7/02* (2006.01)
*G02C 7/06* (2006.01)

(52) U.S. Cl.
CPC ............ *G02C 7/065* (2013.01); *G02C 7/021* (2013.01); *G02C 7/025* (2013.01); *G02C 7/027* (2013.01); *G02C 7/028* (2013.01); *G02C 7/061* (2013.01)

(58) Field of Classification Search
CPC ........ G02C 7/065; G02C 7/021; G02C 7/025; G02C 7/027; G02C 7/028; G02C 7/061
(Continued)

(56) References Cited

U.S. PATENT DOCUMENTS

| 4,934,808 A | 6/1990 | Kitani |
| 5,784,144 A | 7/1998 | Kelch et al. |

(Continued)

FOREIGN PATENT DOCUMENTS

| JP | S62-47284 B2 | 10/1987 |
| JP | S64-35524 A | 2/1989 |

(Continued)

OTHER PUBLICATIONS

Oct. 4, 2016 International Preliminary Report on Patentability issued in Patent Application No. PCT/JP2015/058260.
(Continued)

*Primary Examiner* — James R Greece
(74) *Attorney, Agent, or Firm* — Oliff PLC

(57) ABSTRACT

A progressive addition lens, a manufacturing method and a design method therefor, and a progressive addition lens manufacturing system, capable of flexibly adapting to an actual use state of a wearer and are optimal for each wearer, for determining a main line of sight considering not only convergence of the eye occurring with near vision including passive accommodative power but also convergence of the eye induced by using an accommodative power margin of the eye. The design method includes a first main line of sight calculation step of calculating a first main line of sight, where accommodative convergence caused by use of the accommodative power margin is considered, based on lens design information including at least information of accommodative power of the eye and a final main line of sight
(Continued)

determination step of determining a final main line of sight of a lens from the first main line of sight.

12 Claims, 16 Drawing Sheets

(58) Field of Classification Search
  USPC .................................................. 351/159.42
  See application file for complete search history.

(56) References Cited

U.S. PATENT DOCUMENTS

| | | | |
|---|---|---|---|
| 6,074,061 A | 6/2000 | Miura | |
| 6,832,834 B2 | 12/2004 | Haimerl et al. | |
| 2003/0048410 A1 | 3/2003 | Baumbach et al. | |
| 2004/0095553 A1 | 5/2004 | Dorsch et al. | |
| 2011/0013137 A1 | 1/2011 | Kitani | |
| 2012/0016645 A1 | 1/2012 | Altheimer et al. | |
| 2012/0105802 A1* | 5/2012 | Duong | A61B 3/113 351/210 |
| 2012/0113387 A1 | 5/2012 | Mori et al. | |

FOREIGN PATENT DOCUMENTS

| | | |
|---|---|---|
| JP | H01-133023 A | 5/1989 |
| JP | H11-125799 A | 5/1999 |
| JP | 2003-521741 A | 7/2003 |
| JP | 2004-101879 A | 4/2004 |
| JP | 2012-103312 A | 5/2012 |
| JP | 2012-515933 A | 7/2012 |
| JP | 2013-076933 A | 4/2013 |
| JP | 2014-077816 A | 5/2014 |
| WO | 2010/038739 A1 | 4/2010 |

OTHER PUBLICATIONS

Oct. 27, 2017 Extended European Search Report issued in European Patent Application No. EP 15774484.8.
Jun. 16, 2015 International Search report issued in Patent Application No. PCT/JP2015/058260.

* cited by examiner

PROGRESSIVE ADDITION LENS, DESIGN METHOD AND MANUFACTURING METHOD THEREFOR, AND PROGRESSIVE ADDITION LENS MANUFACTURING SYSTEM

TECHNICAL FIELD

The present invention relates to a progressive addition lens, a design method and a manufacturing method therefor, and a progressive addition lens manufacturing system.

BACKGROUND ART

Presbyopia is a state where accommodative power of the eyes is deteriorated due to aging and focusing on a near object is difficult. In order to improve this symptom of presbyopia, progressive addition lenses have been developed as spectacle lenses for presbyopia. The progressive addition lenses include, depending on usage (distance range where clear vision is desired), common types of bifocal use, indoor types of occupational use, etc.

For example, a bifocal progressive addition lens includes a region for distance vision (distance portion) at an upper portion of the lens, a region for near vision (near portion) at a lower portion of the lens, and a corridor connecting the distance portion and the near portion having different powers. In the corridor, the power successively varies from a power of the distance portion to a power of the near portion. Thus, even when a line of sight shifts between distance vision and near vision, looking through the corridor allows the line of sight to shift with less discomfort over a wide range from distance vision to near vision.

When designing such a progressive addition lens, first, a reference line for determining a configuration surface of the lens (corridor surface) called a main line of sight or a meridian is determined and then a surface configuring the lens is optimized. Therefore, the main line of sight or the like determines performance of the lens and thus how to determine the main line of sight or the like is quite important. The main line of sight is generally defined as a line along points on the lens where a frequency of a line of sight to pass is the highest when the lens is worn as spectacles and the line of sight shifts from distance vision to near vision (when the line of sight shifts from the upper portion to the lower portion of the lens). Meanwhile, the meridian is defined as a line where arbitrary cross sections of respective points on the line have the same curvature. The meridian is usually arranged at a position where a frequency of a line of sight to pass is the largest. Therefore, when the main line of sight or the like is determined, it is necessary to calculate the position on the lens where a line of sight passes most frequently. A general main line of sight on the lens is illustrated in FIG. 1.

In FIG. 1, an upper portion of a round lens 1' is positioned at an upper portion of the eye of a wearer when the lens 1' is worn while a lower portion of the lens 1' is positioned at a lower portion of the eye of the wearer with a left side of the lens 1' positioned on a nose side of the wearer and a right side of the lens 1' positioned on an ear side of the wearer. Therefore, although not illustrated, the upper portion of the lens 1' corresponds to the distance portion while the lower portion of the lens 1' corresponds to the near portion with the center and the vicinity thereof of the lens 1' corresponding to the corridor.

Furthermore, the lens is formed with a hidden mark which cannot be easily recognized by visual inspection. Based on the hidden mark, a predetermined reference point (distance reference point F, near reference point N, fitting point E, etc.) in the lens is determined. In FIG. 1, two hidden marks H are formed on a horizontal line passing through the center of the lens 1' and a midpoint therebetween corresponds to the center of the lens 1'. Therefore in FIG. 1, a group of points having an equivalent distance from the hidden marks H corresponds to a vertical line (Y axis) passing through the center of the lens 1'. Furthermore, a main line of sight 2' passes through the vicinity of the distance reference point F and the fitting point E from the upper portion to the vicinity of the center of the lens 1' in such a manner as to correspond to the vertical line, thereafter is displaced toward the nose side (inclined inward), and extends to the lower portion of the lens 1' while passing through the vicinity of the near reference point N.

The reason for the main line of sight 2' to be displaced toward the nose side is because convergence of the eye that occurs with near vision is considered. When an object existing nearby is looked at with the both eyes, the left and right eyeballs are inclined toward the nose side (inner side) as compared to when an object existing far away is looked at and thus the line of sight is also inclined toward the nose side. This is called convergence of the eye. As illustrated in FIG. 1, therefore, the main line of sight 2' is displaced toward the nose side in the portion lower than the center of the lens 1' that is mainly used for looking at an object existing nearby.

As a method to determine a main line of sight, for example, Patent Literature 1 describes about determining a meridian considering convergence of the eye that occurs with near vision. In Patent Literature 1, however, neither a prescribed power nor an object distance is considered.

Meanwhile, Patent Literature 2 describes about determining a main line of sight with a focus on that a convergence amount of the eye that occurs with near vision is different depending on a prescribe power; however, an object distance is not considered.

Patent Literature 3 describes about determining a main line of sight considering prescription information such as a power, an addition power, prism, and a pupillary distance (PD) and an object distance.

CITATION LIST

Patent Literature

Patent Literature 1: JP 62-47284 B
Patent Literature 2: U.S. Pat. No. 5,784,144
Patent Literature 3: U.S. Pat. No. 6,832,834

SUMMARY OF INVENTION

Technical Problem

According to a method described in Patent Literature 3, a main line of sight can be determined where the prescription information, an object distance with near vision, and a convergence amount caused by accommodative power of the eye corresponding thereto are considered. Here, the accommodative power of the eye is considered to act only for the purpose of complementing a shortage of an addition power of a lens for looking at an object at an assumed object distance. When the mainline of sight is determined in this manner and a progressive addition lens is thereby designed, however, a wearer actually wearing the lens is not always looking at an object existing at an object distance having been assumed at the time of lens designing through a lens point suitable for looking at that distance. This is because that there are many cases where, even after complementing the shortage of the amount of the accommodative power remaining in the eye of the wearer wearing the progressive addition lens, accommodative power necessary for looking at an even nearer object still remains.

Convergence of the eye induced by exertion of the accommodative power of the eye is called accommodative convergence. A specific example may be, when a wearer looks at an object at an object distance of 40 cm (object power of 2.5 D), the wearer can clearly see the object by unconsciously exerting accommodative power (0.5 D) at a lens point with an addition power of 2.0 D (diopters) on the main line of sight. However, there are cases where, when the wearer actively exerts own maximum accommodative power, an object at a position at an object distance less than 40 cm (with an object power larger than 2.5 D) can be clearly seen at the lens point with the addition power of 2.0 D on the main line of sight.

In the related methods, the main line of sight is determined with an understanding that accommodative power of the eye is exerted only by a difference between the object power (reciprocal of the object distance) and an added refractive power on the lens. The accommodative power for complementing this shortage is exerted unconsciously and is a minimum accommodative power necessary for near vision. Therefore, tentatively referring to this accommodative power as a passive accommodative power, the passive accommodative power in the above example equals 0.5 D. The passive accommodative power never exceeds the maximum accommodative power of a wearer and thus the related methods do not consider a difference between the maximum accommodative power and the passive accommodative power at all. When this difference between the maximum accommodative power and the necessary minimum accommodative power (passive accommodative power) is defined as an accommodative power margin, the related design methods do not consider the accommodative power margin at all and thus do not assume at all that the wearer may actively use own accommodative power.

When the wearer uses the accommodative power margin, the wearer sees an object through a lens point existing on the inner side (nose side) from the main line of sight assumed in designing in the related methods since the eye further converges due to accommodative convergence. Usually, a region with the least astigmatism is arranged on the main line of sight and thus, when a point of actual sight is inclined toward the nose side (inclined inward) from the main line of sight assumed in designing, blur, warping, or the like of images occurs. Especially when accommodative convergence more than assumed in the related designing occurs in the corridor for intermediate vision or the near portion for near vision, the wearer may look at an object through an astigmatism region and thus blur, warping, or the like of images may be even larger.

The present invention has been devised in consideration to the above circumstances with an object to provide a progressive addition lens, a manufacturing method and a design method therefor, and a progressive addition lens manufacturing system, capable of flexibly adapting to an actual use state of a wearer and optimal for each wearer, of determining a main line of sight considering not only convergence of the eye occurring with near vision including a passive accommodative power but also convergence of the eye induced by using an accommodative power margin of the eye.

Solution to Problem

A first aspect of the present invention is a design method of a progressive addition lens, the method including: a first main line of sight calculation step of calculating a first main line of sight, where accommodative convergence caused by use of an accommodative power margin of an eye is considered, based on lens design information including at least information of accommodative power of the eye of a wearer; and a final main line of sight determination step of determining a final main line of sight of a lens from the first main line of sight.

In the first aspect, it is preferable to include a second main line of sight calculation step of calculating a second main line of sight, where the accommodative power margin is not considered, based on the lens design information and to determine the final main line of sight from the first main line of sight and the second main line of sight.

In the first aspect, it is preferable to include a first object distance calculation step of calculating, as a first object distance, a minimum value of object distance where clear vision can be obtained with the whole accommodative power margin of the eye exerted at each point on the second main line of sight and to calculate, in the first main line of sight calculation step, the first main line of sight using the first object distance instead of a second object distance used for calculating the second main line of sight.

In the first aspect, it is preferable to determine, in the final main line of sight determination step, the final main line of sight by performing weighting on the first main line of sight and the second main line of sight and synthesizing the first main line of sight and the second main line of sight. It is more preferable to perform weighting based on variations of refractive power of the lens on the second main line of sight.

In the first aspect, it is preferable to adjust a minimum value of the first object distance such that the minimum value corresponds to a reference object distance when the minimum value of the first object distance of the first object distances calculated for respective points on the second main line of sight is smaller than the reference object distance set to the lens.

A second aspect of the present invention is a manufacturing method of a progressive addition lens of designing and manufacturing a progressive addition lens based on lens design information for designing the progressive addition lens, the method including: a lens design information acquisition step where a manufacturing side device arranged on a manufacturing side of the progressive addition lens acquires the lens design information transmitted from an order placing device arranged on an order placing side of the progressive addition lens; a lens design step of designing the progressive addition lens based on the lens design information using the design methods of a progressive addition lens according to the first aspect; and a lens manufacturing step of manufacturing the progressive addition lens based on design data acquired in the lens design step.

In the second aspect, it is preferable that the manufacturing side device calculates the accommodative power of the eye from information other than information of the accommodative power of the eye included in the lens design information when the information of the accommodative power of the eye of the wearer is not included in the acquired lens design information and designs the progressive addition lens based on the calculated accommodative power of the eye and the lens design information.

A third aspect of the present invention is a progressive addition lens manufacturing system where an order placing device arranged on an order placing side of a progressive addition lens and a manufacturing side device arranged on a manufacturing side of the progressive addition lens are connected via a communication channel, where the order placing device includes a data transmission section to transmit, as data, lens design information for designing the progressive addition lens, the manufacturing side device includes a computer section and a data acquisition section to acquire the lens design information as the data, and the computer section includes a first main line of sight calculation section to calculate a first main line of sight, where accommodative convergence caused by use of an accommodative power margin of an eye of a wearer is considered, based on the lens design information acquired by the data acquisition section and a final main line of sight determination section to determine a final main line of sight of the lens from the first main line of sight.

In the third aspect, it is preferable that the computer section includes an accommodative power calculation section to calculate accommodative power of the eye of the wearer, the accommodative power calculation section calculates the accommodative power of the eye from information other than information of the accommodative power of the eye included in the lens design information when the information of the accommodative power of the eye is not included in the lens design information, and the final main line of sight is determined from the first main line of sight calculated based on information of the calculated accommodative power of the eye and the lens design information.

A fourth aspect of the present invention is a progressive addition lens formed with two hidden marks for determining a predetermined reference point on the lens, where, assuming a vertical line passing through a midpoint of a line connecting the two hidden marks and extending in a vertical direction of the progressive addition lens, an entire main line of sight, on a convex surface and a concave surface of the progressive addition lens, exists on a nose side with respect to the vertical line, the main line of sight and the vertical line share no common point, and a shape of the main line of sight is not linear.

A fifth aspect of the present invention is a progressive addition lens formed with two hidden marks for determining a predetermined reference point on the lens, where, on a convex surface of the progressive addition lens, an inward inclination amount, of the main line of sight of the progressive addition lens on a linear line T passing through a midpoint of a line connecting a distance reference point and a near reference point defined for the progressive addition lens and parallel to a line connecting the two hidden marks, is larger than an inward inclination amount I on the linear line T calculated from the following formula 1, and a shape of the main line of sight is not linear.

Where, letters W, H, V, D, C, and K in the following formula 1 represent, respectively, a reciprocal of a target distance, a PD of one of the eyes, a distance between a back vertex of the progressive addition lens and a rotation point of the eyeball, a power of a horizontal cross section of the progressive addition lens, a central thickness of the progressive addition lens, and a parameter expressed by the following formula 2.

[Mathematical Formula 1]

$$I = -\frac{WHV}{(1000-VD)+WV}\left(1-\frac{C}{K}\right)$$ Formula 1

[Mathematical Formula 2]

$$K = \frac{V}{-1+\frac{VD}{1000}}$$ Formula 2

A sixth aspect of the present invention is a progressive addition lens formed with two hidden marks for determining a predetermined reference point on the lens, where, on a concave surface of the progressive addition lens, an inward inclination amount, of the main line of sight of the progressive addition lens on a linear line T passing through a midpoint of a line connecting a distance reference point and a near reference point defined for the progressive addition lens and parallel to a line connecting the two hidden marks, is larger than an inward inclination amount I' on the linear line T calculated from the following formula 3, and a shape of the main line of sight is not linear.

Where, letters W, H, V, and D in the following formula 3 represent, respectively, a reciprocal of a target distance, a PD of one of the eyes, a distance between a back vertex of the progressive addition lens and a rotation point of the eyeball, and a power of a horizontal cross section of the progressive addition lens.

[Mathematical Formula 3]

$$I' = -\frac{WHV}{(1000-VD)+WV}$$ Formula 3

Advantageous Effects of Invention

The present invention allows for providing a progressive addition lens, a design method and a manufacturing method therefor, and a progressive addition lens manufacturing system which are capable of flexibly adapting to an actual use state of a wearer and are optimal for each wearer by determining a main line of sight not only considering that accommodative power of the eye is exerted only by a difference between an object power and an added refractive power on the lens (that is, a passive accommodative power) in a model assumed from prescription information, layout information, and an object distance as in the related art but also considering that the accommodative power possessed by the wearer is actively used to a maximum degree.

DESCRIPTION OF EMBODIMENTS

Figure 1:
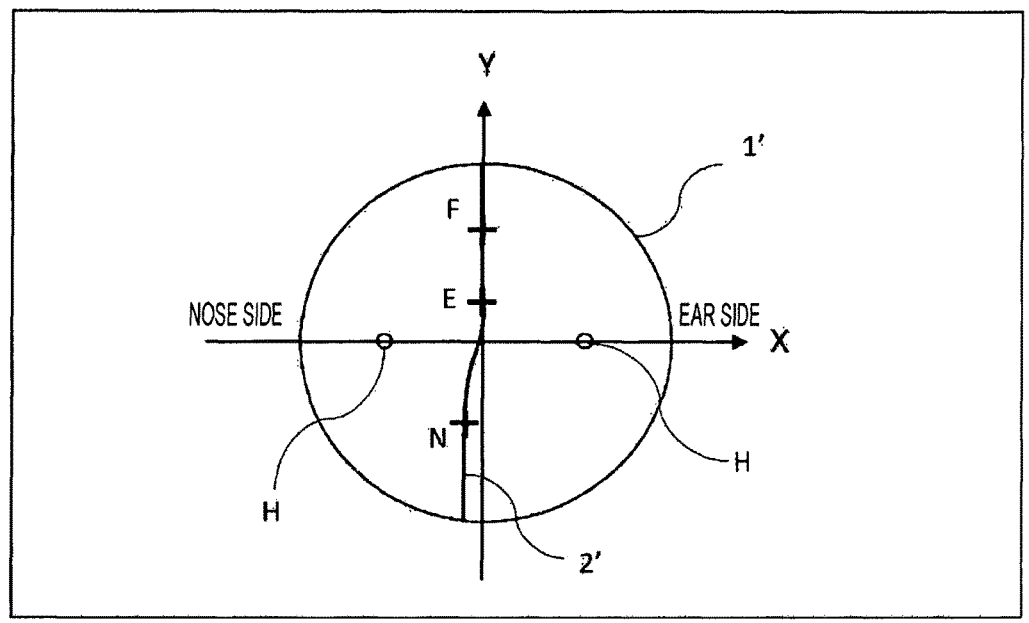
FIG. 1 is a plan schematic diagram of a progressive addition lens.

Hereinafter, the present invention will be described in detail in the following order based on embodiments illustrated in the drawings.
1. Relation between main line of sight and convergence
2. Configuration of progressive addition lens manufacturing system
3. Design method of progressive addition lens
   3-1 Lens design information
   3-2 Second main line of sight calculation step
   3-3 First object distance calculation step
   3-4 First main line of sight calculation step
   3-5 Final main line of sight determination step
   3-6 Others
4. Manufacturing method of progressive addition lens
5. Progressive addition lens
   5-1 Lens A
   5-2 Lens B
6. Effects of the present embodiment 1. Relation Between Main Line of Sight and Convergence In the present invention, a main line of sight is a line connecting points where astigmatism is minimized upon shifting from distance vision to near vision while a lens is worn as spectacles. At a point on the main line of sight, therefore, warping of images seen through the lens is minimized. In the present invention, it is thus preferable that the main line of sight is arranged at points where a line of sight passes most frequently on the lens.

Incidentally, the main line of sight and a meridian are different in a strict sense; however, they are used as terms representing the same meaning in most of the cases and thus are not distinguished. In the present invention, however, the term "main line of sight" is used since the focus is on a point where a line of sight passes through on the lens.

As illustrated in FIG. 1, a position of a main line of sight 2' on a lens 1' can be presented as a displacement in a horizontal (X axis) direction on the lens from a vertical line (Y axis) passing through a midpoint between two hidden marks H formed on a horizontal line of the lens 1'. In FIG. 1, a nose side represents a positive side of the X axis while an ear side represents a negative side of the X axis.

Moreover, on the main line of sight 2', a power (refractive power) varies. With the hidden marks H as a reference, a distance reference point F that is a reference point for measuring a distance power and a near reference point N that is a reference point for measuring a near power are arranged on the main line of sight 2'. Furthermore, a point corresponding to a pupil position in front view is regarded as a fitting point E, which is on the Y axis upper than the center of the lens in FIG. 1.

Figure 2:
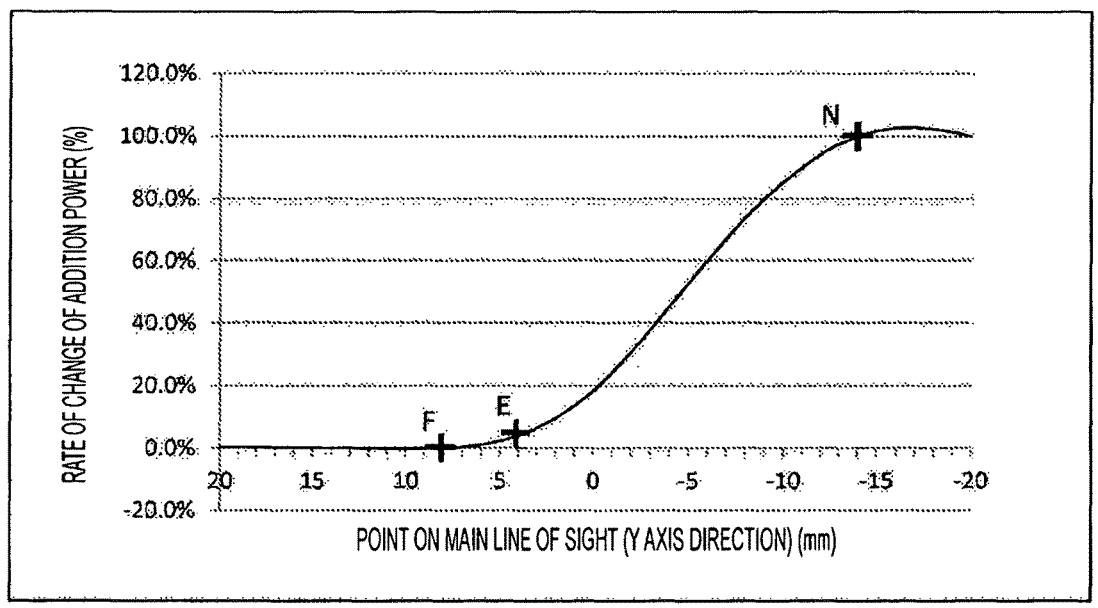
FIG. 2 is a diagram illustrating change ratios of addition power on a main line of sight.

A difference between a distance power (refractive power) at the distance reference point F and a near power (refractive power) at the near reference point N is set as a so-called addition power. FIG. 2 is a diagram illustrating change ratios of addition power on the main line of sight. In FIG. 2, a power (refractive power) for distance vision is zero and a power for near vision starts to be added from a point of Y=+8 mm on the main line of sight. At a point of Y=−14 mm, a prescribed addition power (100% of the addition power) is added.

In the related art, such a main line of sight is obtained from prescription information, layout information, and information of an object distance considering that accommodative power of the eye complements only by a shortage of added refractive power on the lens when an object at a certain distance is looked at. A method of obtaining a location of a main line of sight on a convex surface of a lens in the related art will be described with FIG. 3. Assuming a distance between an object O and the center of the eyeball P as an object distance (mm), in Patent Literature 1 an intersection A of the line OP and the lens is regarded as a point of the main line of sight on the lens and a displacement amount thereof equals to a length AA' of a perpendicular extending from the intersection A to a vertical line passing through the center of the eyeball P. Meanwhile in Patent Literatures 2 and 3, a power, a prismatic effect, etc. of a lens are considered while a point B is regarded as a point of a main line of sight on the lens and a displacement amount thereof equals to a length BB' of a perpendicular extending from the point B to the vertical line passing through the center of the eyeball P. Furthermore in Patent Literature 3, a displacement amount is calculated considering a power or the like at a position in the vertical direction (Y axis direction) of the lens illustrated in FIG. 1 with varying object distances, thereby determining a main line of sight.

As described above, the progressive addition lens is formed with the distance portion for distance vision, the near portion for near vision, and the corridor for intermediate vision between the distance vision and the near vision based on the main line of sight determined in the above manner. In design, lens regions are classified into the distance portion, the near portion, and the corridor; however in an actual progressive addition lens, boundaries thereamong are not clear. Moreover, in design an object distance is assumed for each point on the lens; however when the progressive addition lens is worn as spectacles, a wearer is not always looking at an object existing at the object distance from a lens point where the object distance has been set in the design. This is because the wearer may look at an object existing closer than the object distance from a lens point where the object distance is set by actively exerting accommodative power of the eye (using an accommodative power margin).

Figure 3:
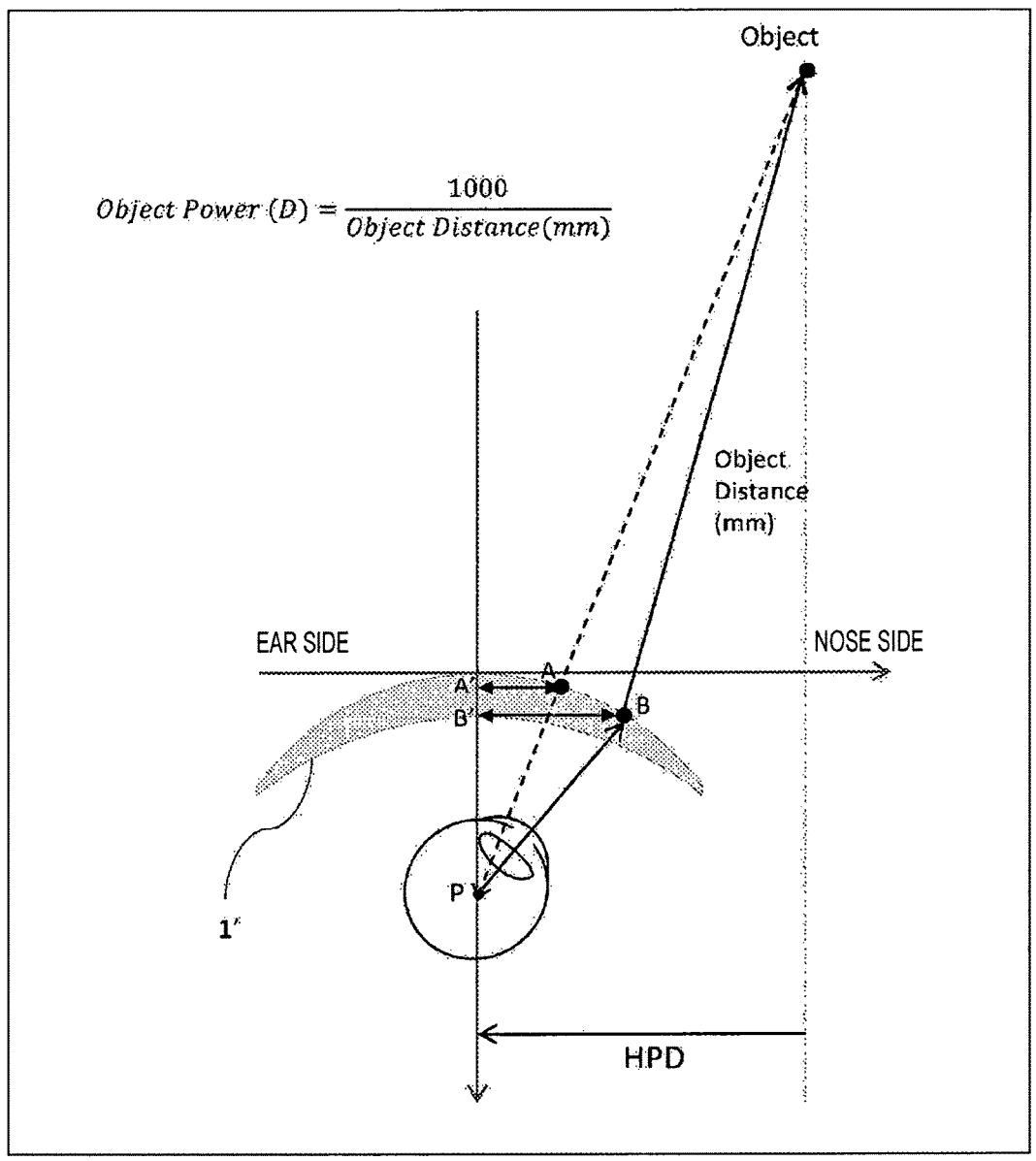
FIG. 3 is a diagram for explaining a method for calculating a position of a main line of sight on a lens considering convergence of the eye occurring with near vision.

Incidentally, the accommodative power is a power to change refractive power of the crystalline lens by changing the thickness thereof and thus a magnitude of accommodative power can be represented as refractive power. Furthermore as illustrated in FIG. 3, when a reciprocal of an object distance (mm) is represented as an object power (unit used is D (diopter)), the object power corresponds to an addition power of the lens for clearly seeing an object existing at that object distance without using the accommodative power. Therefore, using the object power is convenient for lens design and thus the object power is used herein as necessary instead of the object distance.

Furthermore, when the accommodative power is exerted the eyeball is rarely inclined outward. In other words, the accommodative power presents a positive power but a negative power. Thus, the accommodative power acts (asymmetrically) such that the main line of sight is displaced only toward the nose side when the main line of sight is determined. When the main line of sight is determined considering the accommodative power, therefore, it is only required to consider an inward inclination amount.

As described above, when the accommodative power margin of the eye of the wearer is exerted, the eye converges even more due to accommodative convergence. That is, the eye of the wearer is more inclined inward (toward the nose side) than the main line of sight assumed in the design of the related art when the wearer intends to look at an object closer than an object at a distance assumed in the design of the related art.

For example, assuming the accommodative power of the wearer as 1.0 D (diopters), even when an object existing at an infinite distance (that is, where the object power equals 0 D) approaches to a distance of 1 m, exerting the accommodative power allows for clear vision. If, at a lens point where the object distance is set to the infinite distance, the whole accommodative power is actively exerted and this is expressed as convergence of the eye, the eyeball is inclined toward the nose side where the object existing at a position of 1 m of object distance (that is, where the object power equals 1.0 D) can be clearly seen if the wearer intends to. In this case the accommodative power margin is 1.0 D, which is considered as the maximum accommodative power itself.

With distance vision as described above, actively exerting the accommodative power to cause convergence of the eye may not occur, however from intermediate vision to near vision, such accommodative power may be often used to see an object existing relatively close. Based on this, when a lens where use of the accommodative power margin (for example, lenses designed by the techniques described in Patent Literatures 1 to 3) is not considered is worn as spectacles, at a lens point where an object distance assumed in design is set, an object existing closer than that object distance may be looked at by actively using the accommodative power. That is, when the wearer uses the accommodative power more than assumed in the design and accommodative convergence due to this occurs, a point on the lens for looking at an object existing at that object distance is shifted from the main line of sight. Here, since the width (length of the lens in the horizontal direction (X axis direction)) of the corridor used for intermediate vision or the near portion used for near vision is narrow, even with a small amount of shift from the main line of sight, the point is included in a region with large astigmatism. Therefore an image of the object to look at may be blurred or warp.

The present inventor therefore proposes the following design method of a progressive addition lens in order to determine a main line of sight such that a lens point, where a line of sight passes with a high frequency for looking at an object, is included in the main line of sight or the vicinity thereof (that is, a point with suppressed astigmatism) even when convergence caused by using the accommodative power margin for looking at the object occurs.

2. Configuration of Progressive Addition Lens Manufacturing System

First, a progressive addition lens manufacturing system and a configuration thereof used in a design method and a manufacturing method of the progressive addition lens of the present embodiment will be described.

Figure 4:
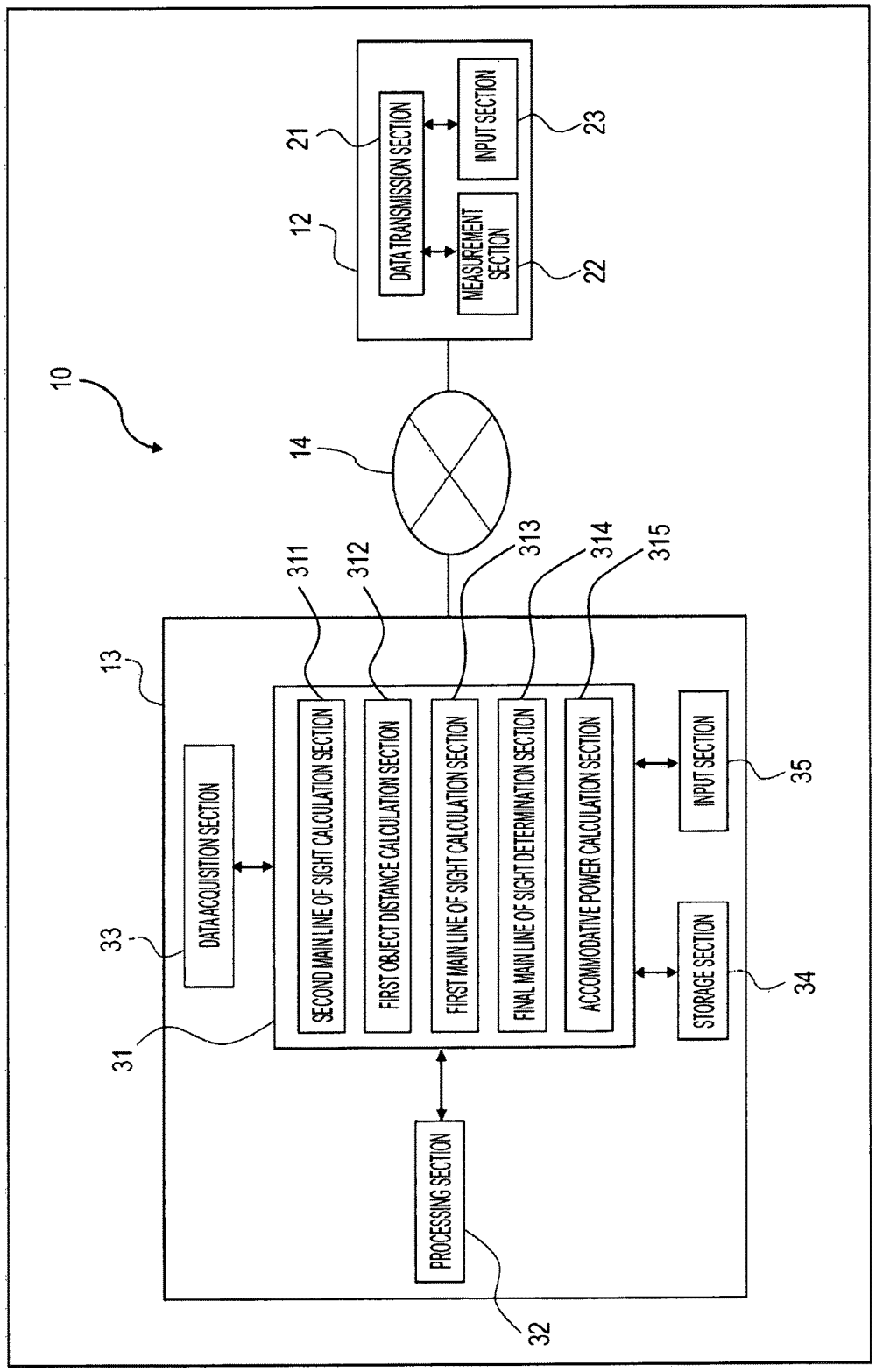
FIG. 4 is a schematic diagram illustrating a configuration of a progressive addition lens manufacturing system of the present embodiment.

FIG. 4 is a schematic diagram illustrating an exemplary configuration of the progressive addition lens manufacturing system of the present embodiment.

In FIG. 4, a progressive addition lens manufacturing system 10 includes an order placing device 12 and a manufacturing side device 13 connected to each other to allow communication therebetween by a communication channel 14. The order placing device 12 is used while, for example, installed at an optician's store. The device includes a data transmission section 21 to transmit information necessary for designing a lens (lens design information) to the manufacturing side device 13. The device may further include a measurement section 22 to measure a distance power, a near power, an addition power, a prismatic effect, a PD, accommodative power of the eye, etc. The device may further include an input section 23 for inputting such information to the order placing device 12. The manufacturing side device 13 is used while, for example, installed at a manufacturing plant of spectacle lenses. Details will be described later. The communication channel 14 may be, for example, the Internet, a dedicated channel, or the like.

The manufacturing side device 13 includes a computer section 31 to perform arithmetic processing for lens designing where a data acquisition section 33, to acquire information transmitted from the order placing device 12, transmits the lens design information to the computer section 31 via the communication network 4. The computer section 31 is connected to a storage section 34 and is capable of storing data necessary for lens designing or data acquired after designing in the storage section 34 as required. The computer section 31 is further connected to an input section 35 and thus the information necessary for lens designing can be input to the computer section 31 via the input section 35.

The computer section 31 determines elements of the lens including the main line of sight by arithmetic processing based on the lens design information acquired by the data acquisition section 33 and thereby designs the lens. In the present embodiment, the computer section 31 includes a second main line of sight calculation section 311, a first object distance calculation section 312, a first main line of sight calculation section 313, and a final main line of sight determination section 314. Processing performed in the respective sections will be described later.

The computer section 31 further includes an accommodative power calculation section 315. When information of accommodative power of the eye is not included in the lens design information transmitted from the order placing device 12, the accommodative power calculation section 315 calculates accommodative power based on other information included in the lens design information such as addition power, a near work target distance, and age and adds information of the calculated accommodative power to the acquired lens design information.

The computer section 31 is further connected to a processing section 32 and design data obtained after designing is transmitted to the processing section 32 where lens processing is performed based on the design data and a lens reflected with the design data is manufactured. Thereafter, the lens determined as a conforming article after testing or the like is supplied to the optician's store of the order placing side. The lens processing includes, for example, polishing processing of an optical surface of the lens and lens shape processing for fitting into a frame.

3. Design Method of Progressive Addition Lens

A design method of the progressive addition lens of the present embodiment will be described with a flowchart illustrated in FIG. 5.

(3-1 Lens Design Information: S1 to S3)

The lens design information is information necessary for designing a progressive addition lens. The lens design information used upon designing the lens includes at least information of accommodative power of the eye of a wearer. Other information to be included as required includes, for example, a design type of the lens, layout information, a distance power, a near power, an addition power, a prism, a PD, a distance work or a near work target distance, and an age of the wearer. In the present embodiment, the information of the accommodative power of the eye of the wearer may be the information transmitted from the order placing device 12 or the information calculated by the accommodative power calculation section 315 included in the computer section 31.

Incidentally, the information of the accommodative power of the eye included in the lens design information may be information of an accommodative power margin or information of accommodative power which is the sum of the accommodative power margin and the passive accommodative power.

Figure 5:
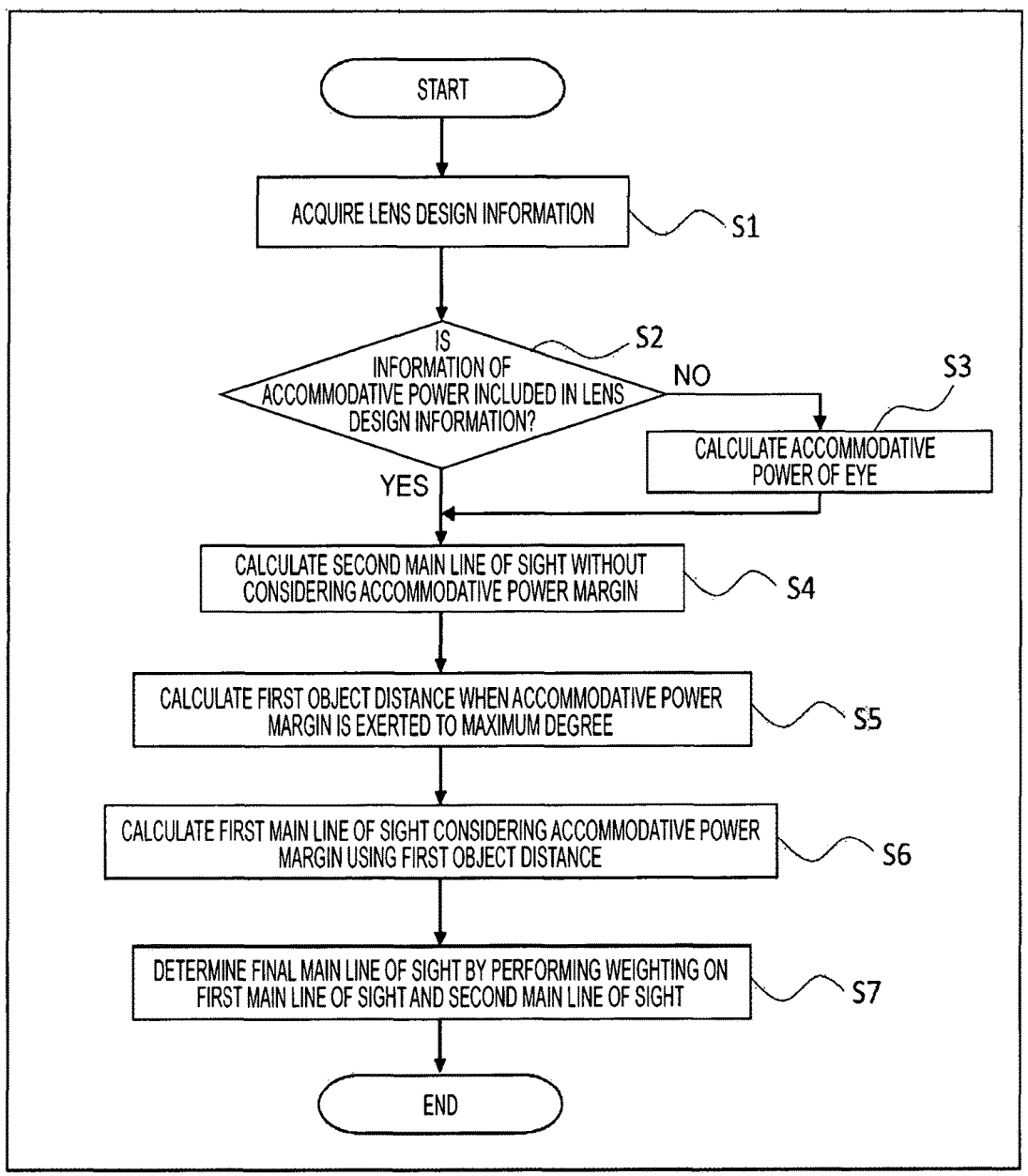
FIG. 5 is a flowchart of a design method of a progressive addition lens of the present embodiment.

As illustrated in FIG. 5, when the information of the accommodative power of the eye is included in the lens design information acquired from the order placing device 12, the main line of sight is determined using this lens design information through steps that will be described later. Meanwhile, when the information of the accommodative power of the eye is not included in the lens design information acquired from the order placing device 12, the accommodative power of the eye is calculated by the accommodative power calculation section 315. The main line of sight is then determined using this as one piece of lens design information.

(3-2 Second Main Line of Sight Calculation Step: S4)

In the present embodiment, first, the second main line of sight calculation section 311 calculates a second main line of sight based on the lens design information (second main line of sight calculation step S4). In the second main line of sight calculation step S4, the second main line of sight is calculated without considering the accommodative power margin of the eye. As a method to calculate the second main line of sight, a known method may be used. Specifically, an object distance (second object distance) corresponding to a point on the lens is set and a magnification of the lens is calculated using the light beam tracing method considering a power, an addition power, prism, a PD, and the like as well as the second object distance. A power is then allocated on the main line of sight according to the second object distance based on the information of the power (a distance power, a near power, and an addition power) included in the lens design information. The second object distance may be determined as appropriate according to a type of lens to be designed, a distance power, an addition power, or the like. For example in a bifocal type, the second object distance from the infinite distance to the near work distance may be set while in an occupational type the second object distance from a finite distance target distance to the near work target distance may be set. Therefore the object distance varies according to a point on the lens and thus, when the second object distance becomes shorter in the lower portion of the lens, an inward inclination amount corresponding to convergence of the eye is calculated and a shape of the second main line of sight is calculated. That is, the second main line of sight is a main line of sight where the accommodative power of the eye minimum required for near vision and convergence caused thereby are considered. On the calculated second main line of sight, a predetermined power is set.

(3-3 First Object Distance Calculation Step: S5)

In a first object distance calculation step S5, the first object distance calculation section 312 calculates the minimum value of object distance where clear vision can be obtained when the accommodative power margin of the eye is used to a maximum degree at respective points on the obtained second main line of sight. Specifically, in the second main line of sight calculation step, it is only required to assume a power where the power set to each of the points on the second main line of sight is added with the maximum power of the accommodative power and, when this assumed power is regarded as the object power, to regard the object distance, which is a reciprocal of the object power, as a first object distance. In the present step, since the power of accommodative power is added, the first object distance becomes a finite value, Here, the minimum value of the first object distance may be adjusted according to a reference object distance set to the lens. In the present embodiment, the minimum value of the object distances set to the lens without considering the accommodative power margin is regarded as the reference object distance. A specific example of the reference object distance may be a near work target distance preferred by a wearer, a near work target distance assumed considering the lens design information, a distance calculated from the sum of an addition power and the accommodative power, or the like. These near work target distances correspond to the minimum value of the second object distance.

Figure 6:
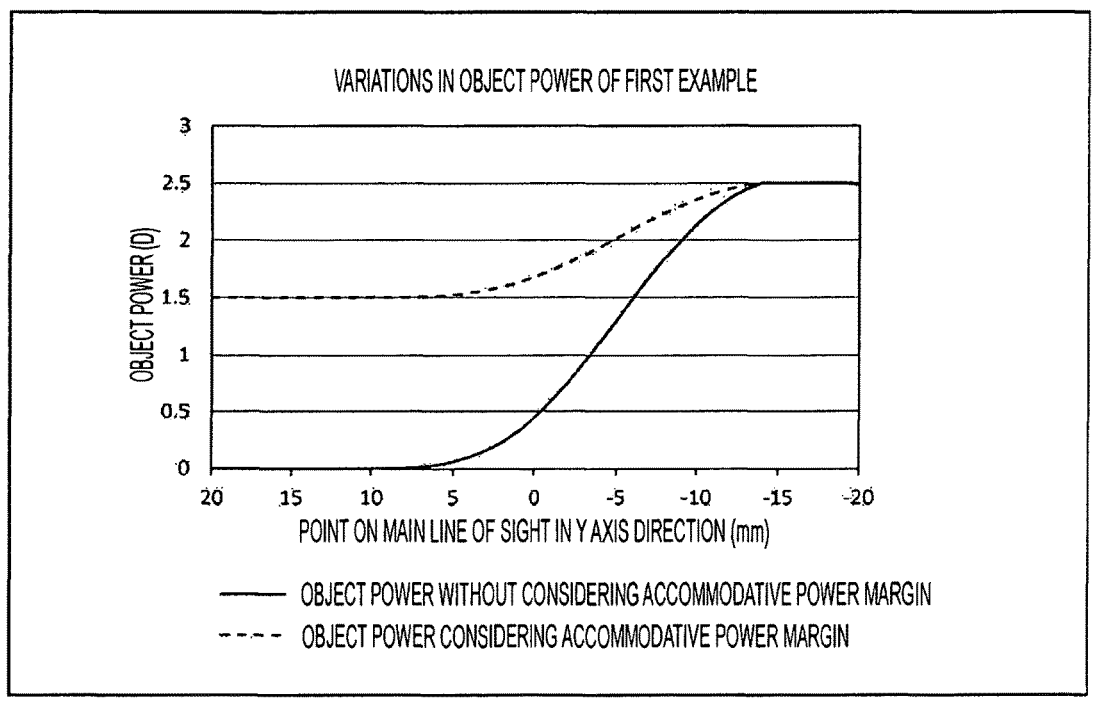
FIG. 6 is a diagram illustrating an object power on a main line of sight in a first example.

A specific example of adjusting the minimum value of the first object distance will be described with a first example, which will be described later. In FIG. 6, when a near work target distance is 40 cm (near object power of 2.5 D), an accommodative power is 1.5 D and an addition power is 1.5 D. At a lens point with an addition power of 1.5 D, when the wearer exerts the accommodative power to a maximum degree, that is, not only exerting passive accommodative power but also exerting the accommodative power margin to a maximum degree, an object power results as 1.5+1.5=3.0

D (object distance of 33 cm). Therefore, an object at a position closer than the near work target distance (40 cm) can be clearly seen.

However, the wearer does not always exert the accommodative power margin to a maximum degree and thus designing, to allow a wearer to clearly see at a distance even closer than a near work target distance preferred by the wearer, is over performance. This may be a design that does not reflect the preference of the wearer. In the present embodiment, therefore, the accommodative power is adjusted. Specifically, when the minimum value of the first object distance is smaller than the near work target distance, the accommodative power is adjusted such that the minimum value becomes larger than the near work target distance. In other words, the accommodative power is adjusted such that the object power calculated from the minimum value of the first object distance does not exceed the object power calculated from the near work target distance. Here, the adjustment is made in a smooth manner to avoid radical change.

In the above example, the addition power is retained at 1.5 D while the accommodative power is regarded as 1.0 D in order to achieve that the object power expressed as the sum of the addition power and the accommodative power equals the near object power (2.5 D), thereby adjusting the first object distance.

(3-4 First Main Line of Sight Calculation Step: S6)

In a first main line of sight calculation step S6, the first main line of sight calculation section 313 calculates the main line of sight in a similar manner to that in the second main line of sight calculation step, except for that an object distance set according to a point on the lens is regarded as the first object distance, and regard this as a first main line of sight The first object distance is calculated as the minimum value of object distance where a clear vision can be obtained when the accommodative power margin of the eye is used to a maximum degree and the accommodative power margin is expressed as convergence motion. Therefore, the first main line of sight calculated using the first object distance is a main line of sight where the whole accommodative power margin of the eye is converted to an amount of convergence of the eye.

(3-5 Final Main Line of Sight Determination Step: S7)

The first main line of sight calculated in the first main line of sight calculation step S6 may be regarded as a final main line of sight of the lens. However, the first main line of sight is set such that astigmatism is suppressed at a point where a line of sight passes through when the accommodative power margin is exerted to a maximum degree and the whole accommodative power is converted to the amount of convergence of the eye. Therefore, designing a lens using this first main line of sight results as a lens with a premise that the whole accommodative power margin is exerted. As described above, however, the lower portion of the lens is used more often than the upper portion of the lens for distance vision while the lower portion of the lens is used more often than the upper portion of the lens for near vision. Therefore, when the first main line of sight is regarded as the final main line of sight, a difference in use frequency of regions on the lens according to an object distance is not considered.

In a final main line of sight determination step S7, therefore, a final main line of sight is determined from the first main line of sight considering which distance each of the regions on the lens is mainly used to look at. In the present embodiment, the final main line of sight determination section 314 determines the final main line of sight such that a displacement amount (inward inclination amount) thereof in the horizontal direction (X axis direction) of the lens is between a displacement amount of the first main line of sight and a displacement amount of the second main line of sight in that direction. This is because the second main line of sight is calculated without considering the accommodative power margin and thus there must be a main line of sight corresponding to actual use of the wearer exerting the accommodative power margin as appropriate between the first main line of sight where the accommodative power margin is considered to a maximum degree and the second main line of sight.

Specifically, the main line of sight is determined by performing weighting on the first main line of sight and the second main line of sight using the following formula 4 and synthesizing the first main line of sight and the second main line of sight.

$$X_{fin} = W \times (X_{ACC} - X_{ini}) + X_{ini} \quad \text{Formula 4}$$

Where: $X_{fin}$ represents a displacement amount of the final main line of sight in the X axis direction; W represents a weighting function; $X_{ACC}$ represents a displacement amount of the first main line of sight in the X axis direction; and $X_{ini}$ represents a displacement amount of the second main line of sight in the X axis direction.

The weighting function is preferably set reflecting a use frequency of a lens region corresponding to an object distance. Alternatively, for example, variations of addition power on the main line of sight may be used as the weighting function. As more near vision is desired in a region on the lens, the addition power becomes larger. The accommodative power margin is used for looking at an object existing at an intermediate or near distance and thus it is preferable to use the variations of addition power as the weighting function.

Passing through the above steps S1 to S7 results in determination of the final main line of sight that is like a backbone of the lens. This final main line of sight is determined while convergence motion of the eye caused by using the accommodative power margin of the eye is sufficiently considered and a use frequency of a lens region corresponding to an object distance is considered at each point on the main line of sight.

(3-6 Others)

After the final main line of sight is determined in the final main line of sight determination step S7, it is only required to optimize the corridor surface based on the main line of sight by performing aspheric surface correction, power correction, or the like using a known method.

In this manner, considering the accommodative power margin of the eye allows for designing the progressive addition lens having the main line of sight where convergence of the eye caused by accommodative function of the eye is considered to a maximum degree. With such a progressive addition lens, even when accommodative convergence of more than assumed in the design of the related art occurs upon looking at an object, a position of a line of sight passing on the lens is on the main line of sight where astigmatism is suppressed to a maximum degree or in the vicinity thereof and thus the object can be clearly seen without warping.

Incidentally, when the wearer wears the progressive addition lens as spectacles, the line of sight of the wearer passes through both of an inner surface (concave surface) and an outer surface (convex surface) of the lens. Therefore in the progressive addition lens, on each of the inner surface and the outer surface of the lens, a main line of sight exists. In the present embodiment, the main line of sight may be determined on both of the inner surface and the outer surface of the lens in the aforementioned method. Alternatively, the main line of sight on one surface (for example the concave surface) may be determined by the aforementioned method and the main line of sight on the other surface (for example the convex surface) may be determined by another method. Specifically, the main line of sight may be determined by calculation considering lens characteristics (refractive index, thickness, power, etc.).

4. Manufacturing Method of Progressive Addition Lens

Next, a manufacturing method of the progressive addition lens of the present embodiment will be described. Also in the present manufacturing method, the aforementioned progressive addition lens manufacturing system 10 is used. Also, as for steps to design the progressive addition lens, the aforementioned design method is used and thus descriptions thereon are omitted.

First, in FIG. 4, the manufacturing side device 13 acquires the lens design information of the progressive addition lens from the order placing device 12 (lens information acquiring step). In the present embodiment, if the acquired lens design information includes the information of the accommodative power of the eye of the wearer, designing of the progressive addition lens is performed by transmitting the lens design information to the computer section 31 and passing through the aforementioned steps, thereby obtaining design data. The acquired design data is stored in the storage section 34 of the manufacturing side device 13. The acquired design data is stored in the storage section 34 of the manufacturing side device 13.

On the other hand when the accommodative power of the eye of the wearer is not included in the acquired lens design information, the accommodative power may be calculated, by the accommodative power calculation section 315 of the manufacturing side device 13, from other information included in the lens design information. Specifically, examples include a method of calculating from the addition power and a method of calculating from a general relation between the age and the accommodative power of the wearer.

The method of calculating from the addition power is, for example, as follows. The addition power is information necessary for designing the progressive addition lens and is usually calculated on the order placing side such as an optician's store. At the optician's store, the addition power is calculated from a near work target distance preferred by the wearer and the accommodative power of the eye measured. The accommodative power is measured in the following manner. First, the maximum distance where the wearer can see clearly is regarded as a distance to a far point while the minimum distance where the wearer can see clearly is regarded as a distance to a near point. Next, the accommodative power is obtained, while converted into diopters, from a difference between a reciprocal of the distance to the far point and a reciprocal of the distance to the near point. Thereafter, a reciprocal of the near work target distance is obtained and thereby the near work target distance is converted into the object power. The addition power is then calculated from the object power and the accommodative power according to the following formula 5.

$$ADD = (1000/L) - a \times ACC \quad \text{Formula 5}$$

In formula 5, letter ADD, L, ACC, and a represent, respectively, an addition power [D], a near work target distance [mm], an accommodative power [D], and a constant where examples include ½ and ⅔.

Therefore if the addition power and the near work target distance are clear, modifying the above formula 5 allows for back calculating the accommodative power.

Furthermore, since relation between the age of the wearer and the accommodative power is known, the accommodative power of the wearer may be estimated from this relation.

In the above manner, the accommodative power of the eye is often measured on the order placing side such as an optician's store; however in the related art, this information of the accommodative power of the eye is not used as information for designing the lens. In the present embodiment, designing the lens using information which is not used in the related art allows for providing the progressive addition lens corresponding to actual use state of the wearer.

The information of the accommodative power calculated in the above manner is included in the lens design information and designing of the progressive addition lens is performed by transmitting the information to the computer section and passing through the aforementioned steps, thereby obtaining design data (lens design step). The acquired design data is stored in the storage section 34 of the manufacturing side device 13 in FIG. 4.

Subsequently, the progressive addition lens is manufactured based on the acquired design data (lens manufacturing step). Specifically, a base material having predetermined optical characteristics (semi-finished lens) is prepared. The base material is mounted to the processing section 32 of the manufacturing side device illustrated in FIG. 4 and the design data transmitted from the storage section 34 is input to the processing section 32, thereby processing the base material such that a distribution of refractive power set in the design data is achieved.

The processing of the base material may be performed by a known method, for example, a surface of the base material is grinded using a grinding device to form an optical surface and polishing is then performed using a polishing device. Thereafter, surface processing such as coating and lens shape processing are performed as necessary, thereby manufacturing the progressive addition lens.

5. Progressive Addition Lens

The progressive addition lens according to the present embodiment designed and manufactured in the aforementioned method has a characteristic configuration. As specific examples thereof, a lens A and a lens B will be described.

(5-1 Lens A)

Figure 7:
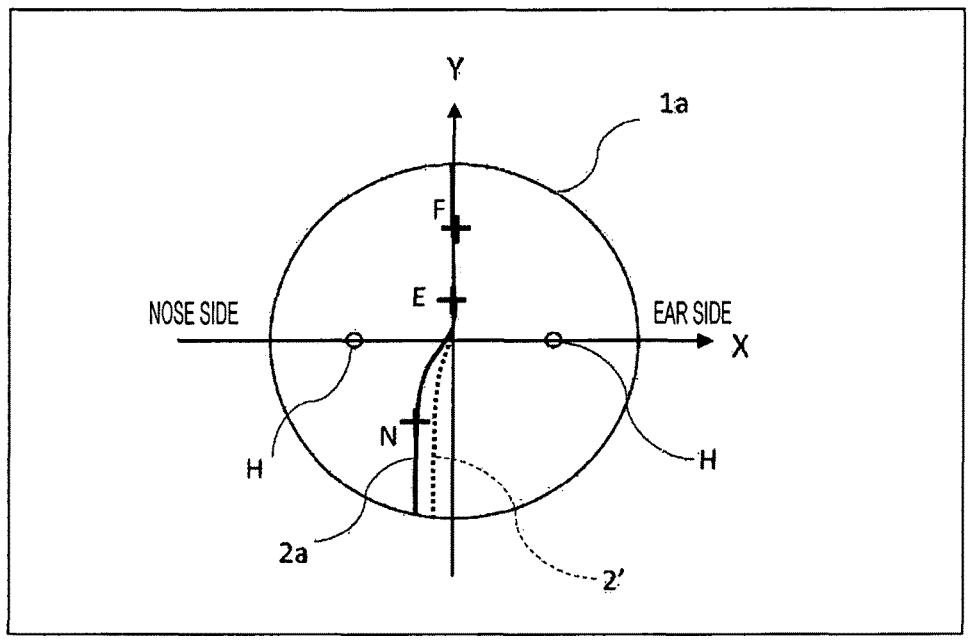
FIG. 7 is a plan schematic diagram of a progressive addition lens (lens A) of the present embodiment.

A lens A1a illustrated in FIG. 7 is a progressive addition lens including a main line of sight (final main line of sight 2a) determined by the aforementioned design method. This final main line of sight 2a is determined considering accommodative convergence caused by the accommodative power margin and thus the final main line of sight 2a is positioned toward a nose side than a main line of sight 2' of the related art. Moreover, the shape of the main line of sight is not linear. Specifically, characteristics of the lens A include that the final main line of sight 2a is positioned toward the nose side than the main line of sight 2' of the related art especially between a distance reference point F and a near reference point N along a vertical line (Y axis) of the lens.

The main line of sight is, strictly speaking, determined using the light beam tracing method or the like but may be also obtained by using an approximation based on characteristics of the lens, prescription information, etc. Moreover in the main line of sight obtained by using an approximation and in the main line of sight obtained by using the light beam tracing method, a displacement amount (inward inclination amount) in the horizontal (X axis) direction of the lens is substantially equivalent especially between the distance reference point and the near reference point.

In the present embodiment, therefore, characteristics of the shape of the main line of sight of the lens A can be defined as follows. That is, a convex surface of the lens A is characterized by that an inward inclination amount, of the main line of sight, on a horizontal line parallel to a linear line passing through a midpoint of a line connecting the distance reference point and the near reference point defined by two hidden marks formed on the lens A and passing through the hidden marks, is larger than an inward inclination amount I calculated from the following approximation 1.

Where, letters W, H, V, D, and C in the following approximation 1 represent, respectively, a reciprocal of a target distance, a PD of one of the eyes, a distance between a back vertex of the lens A and a rotation point of the eyeball, a power of a horizontal cross section of the lens, and a central thickness of the lens A.

[Mathematical Formula 4]

$$I = -\frac{WHV}{(1000 - VD) + WV}\left(1 - \frac{C}{K}\right) \quad \text{Approximation 1}$$

Incidentally, K is expressed by the following formula.

[Mathematical Formula 5]

$$K = \frac{V}{-1 + \frac{VD}{1000}}$$

Also on a concave surface of the lens, like in the above, an inward inclination amount of a main line of sight on the concave surface of the lens A is larger than an inward inclination amount I' calculated from the following approximation 2.

[Mathematical Formula 6]

$$I' = -\frac{WHV}{(1000 - VD) + WV} \quad \text{Approximation 2}$$

The relation between the inward inclination amount of the main line of sight of the lens A and the inward inclination amount I or I' calculated from the approximation 1 or 2 will be described with FIGS. 8A and 8B. In the lens A (progressive addition lens 1a) illustrated in FIGS. 8A and 8B, a vertical line direction of the lens forms a Y axis while a horizontal line direction of the lens forms an X axis. Moreover, a positive side in the X axis direction represents an ear side while a negative side represents a nose side.

Figure 8:
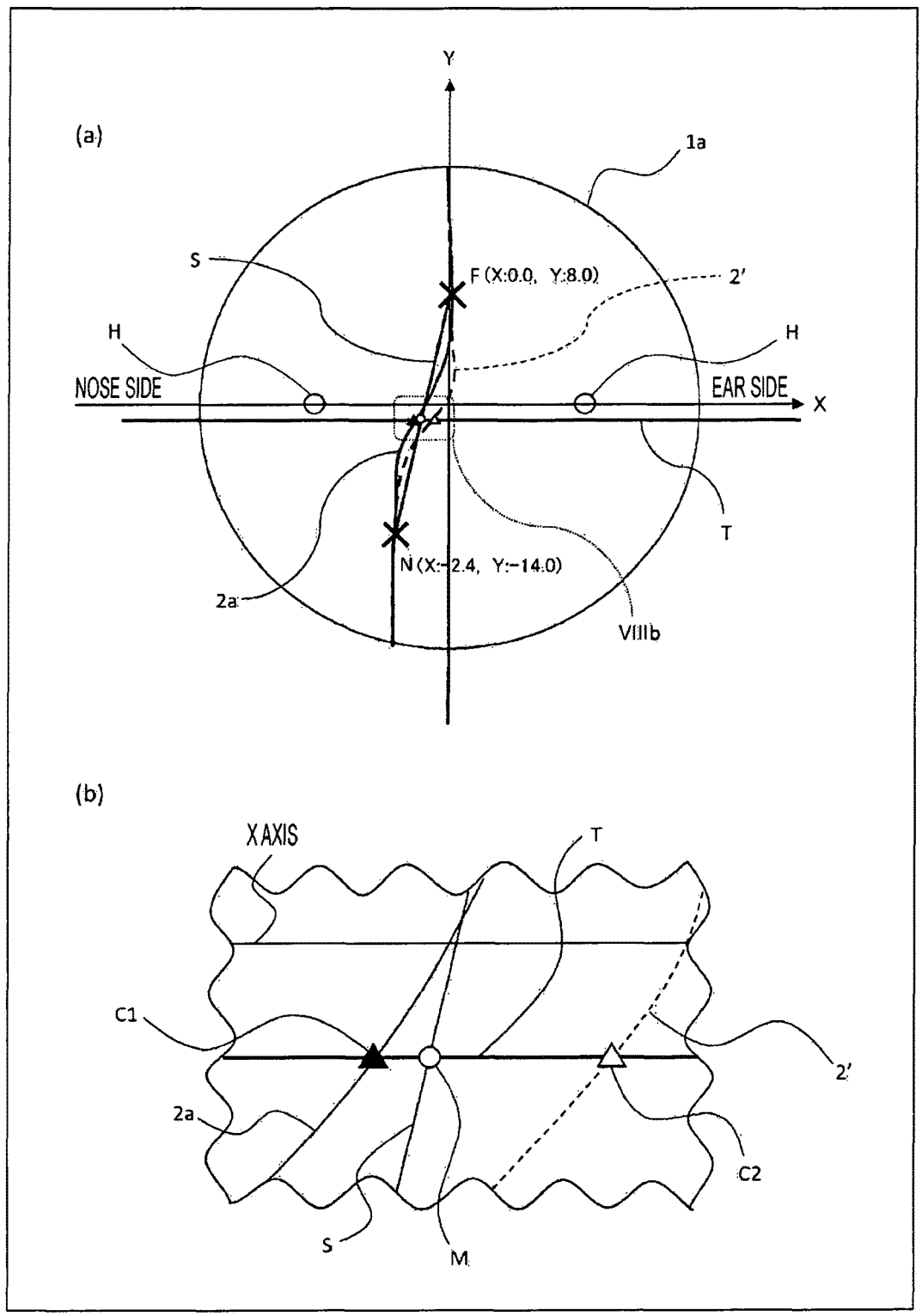
FIG. 8A is a diagram for explaining relation between an inward inclination amount (displacement amount in an X axis direction) of the main line of sight of the progressive addition lens and an inward inclination amount of a main line of sight calculated using an approximation in the progressive addition lens of the present embodiment.
FIG. 8B is an enlarged diagram of a part VIIIb in FIG. 8A.

Furthermore, the distance reference point F and the near reference point N are at coordinate positions illustrated in FIG. 8A. Here, a line S connecting the distance reference point F and the near reference point N is assumed. A line T, passing through a midpoint M of the line S, parallel to a line connecting two hidden marks (namely, the X axis) is assumed. As illustrated in FIG. 8B which is an enlargement of a part VIIIb in FIG. 8A, an intersection C1 between the main line of sight 2a of the lens A, that is a final main line of sight determined by the aforementioned method, and the line T. Likewise, an intersection C2 between the main line of sight 2' calculated from the approximation and the line T is obtained. Since an X coordinate of the intersection C2 corresponds to the inward inclination amount I or I', an X coordinate of the intersection C1 is closer to the nose side than the X coordinate of the intersection C2. An absolute value of the X coordinate of the intersection C1 is larger than that of the intersection C2. That is, the lens A illustrated in FIGS. 8A and 8B satisfies the above definition.

Incidentally, the approximation may include several variations depending on a degree of approximation. Approximation 3 or 4 that is stricter than the approximation 1 or 2 may be used. The approximation 3 on the convex surface is as follows.

[Mathematical Formula 7]

$$I = -\frac{WHK}{-1000 - WV\left(1 - \frac{1}{\cos\beta}\right) - WE + WK}\left(1 - \frac{C}{K}\right) \quad \text{Approximation 3}$$

Incidentally, the values K and E are expressed by the following formulas.

[Mathematical Formula 8]

$$K = \frac{(V - E\cos\beta)}{-\cos\beta + \frac{(V - E\cos\beta)D}{1000}}$$

[Mathematical Formula 9]

$$E = -Y\sin\gamma + \frac{1}{2} \times \frac{B}{1000(N-1)}Y^2\cos\gamma$$

The approximation 4 on the concave surface is as follows.

[Mathematical Formula 10]

$$I' = -\frac{WHK}{-1000 - WV\left(1 - \frac{1}{\cos\beta}\right) - WE + WK} \quad \text{Approximation 4}$$

Incidentally, K and E are as expressed in the above formulas.

Comparing the case of using the approximation 1 or 2 and the case of using the approximation 3 or 4, calculated inward inclination amounts are not substantially different especially between the distance reference point and the near reference point and thus the case of using the approximation 3 or 4 also satisfies the above definition.

Hereinafter, deriving process of the approximation 4 will be described. First, parameters used for deriving the approximation 4 is illustrated in Table 1.

TABLE 1

| | |
|---|---|
| I | INWARD INCLINATION AMOUNT (CONVEX SURFACE REFERENCE) [mm] |
| I' | INWARD INCLINATION AMOUNT (CONCAVE SURFACE REFERENCE) [mm] |
| H | PD OF ONE EYE [mm] |

TABLE 1-continued

| | |
|---|---|
| V | DISTANCE BETWEEN BACK VERTEX OF LENS AND ROTATION POINT OF EYEBALL |
| D | POWER OF HORIZONTAL CROSS SECTION OF LENS (WITHIN X'Z' PLANE) |
| W | POWER OF TARGET DISTANCE [D] |
| L | TARGET DISTANCE [mm] |
| β | ROTATIONAL ANGLE IN VERTICAL DIRECTION [rad] |
| C | LENS CENTER THICKNESS [mm] |
| E | CORRECTION VALUE BY APPROXIMATION SPHERICAL SURFACE OF LENS BACK SURFACE [mm] |
| Y | POINT OF INTERSECTION BETWEEN REFERENCE PLANE S AND TANGENT PLANE AT VERTEX POINT ON LENS BACK SURFACE [mm] |
| B | CURVATURE OF APPROXIMATION SPHERICAL SURFACE OF LENS CONCAVE SURFACE [D] |
| N | REFRACTIVE INDEX OF LENS MATERIAL |
| γ | FORWARD TILTING ANGLE OF LENS [rad] |

Figure 9:
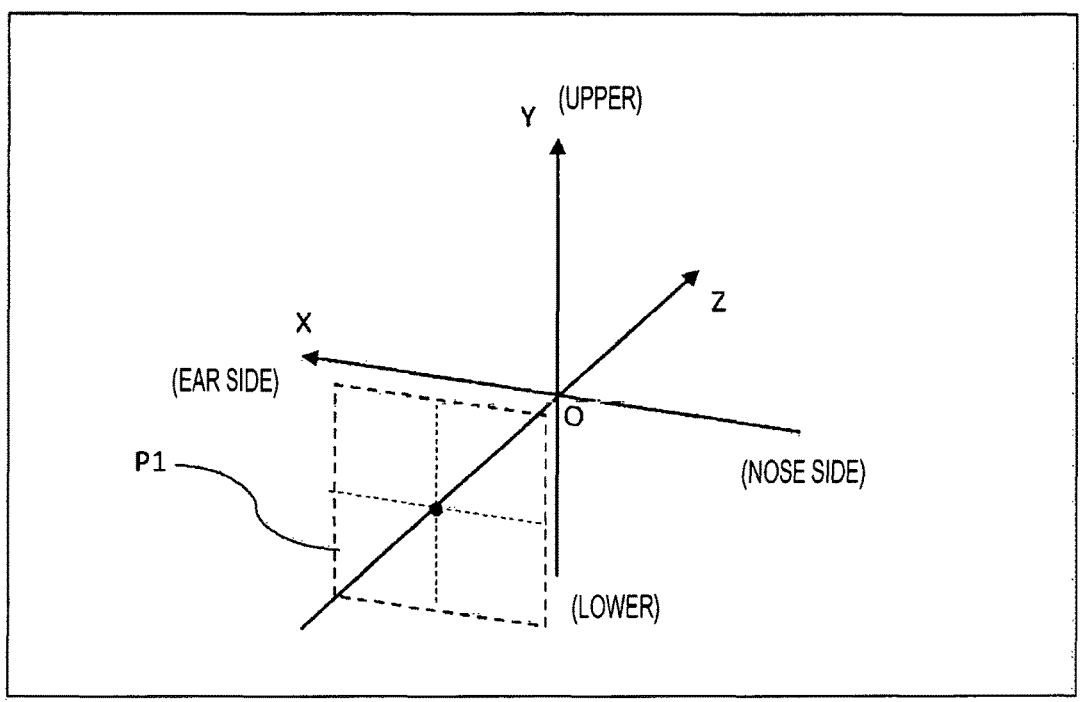
FIG. 9 is a diagram for explaining a process for deriving an approximation 4.

First, as illustrated in FIG. 9, a coordinate system for obtaining a position of the main line of sight is considered. The center O of this coordinate system is a rotation center of the right eyeball, which is not illustrated. A direction toward a nose side of a wearer from an ear side represents an X axis while a direction, perpendicular to the X axis, from a lower part to an upper part of the wearer represents a Y axis. A direction, perpendicular to the X axis and the Y axis, from the center O toward the back of the wearer represents a Z axis. The front of the wearer corresponds to a negative direction of the Z axis. Therefore, a lens (not illustrated) is arranged in this direction. In this manner, at a vertex point on a concave surface of the lens a surface P1 perpendicular to the Z axis can be assumed.

Figure 10:
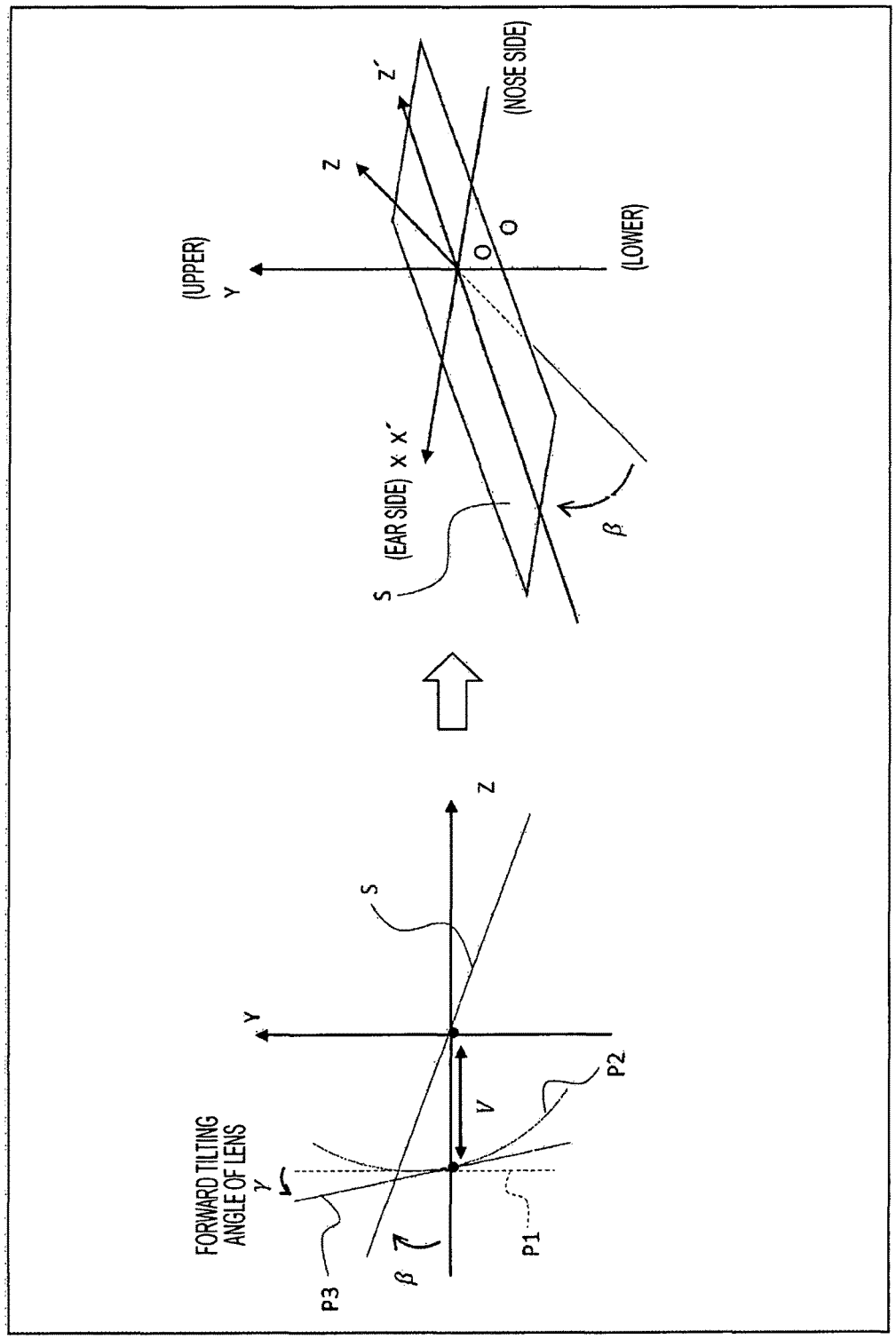
FIG. 10 is a diagram for explaining the process for deriving the approximation 4.

Furthermore as illustrated in FIG. 10 illustrating a Y-Z plane in FIG. 9, approximating the concave surface of the lens arranged in FIG. 9 by a spherical surface P2 and with a forward tilting angle of the lens of γ [rad], a tangent plane P3 at a vertex point of the concave surface tilted from the surface P1 toward the negative side of the Z axis by γ [rad] can be set. Meanwhile, with a rotational angle in the vertical direction of the eyeball of β [rad], a plane where the X-Z plane is tilted by β [rad] can be set. This plane is regarded as a reference plane S for calculating the inward inclination amount. As a result, as illustrated in FIG. 10, a coordinate on the reference plane S can be defined with a Z' axis where the Z axis is tilted by β [rad] and an X' axis equivalent to the X axis.

Figure 11:
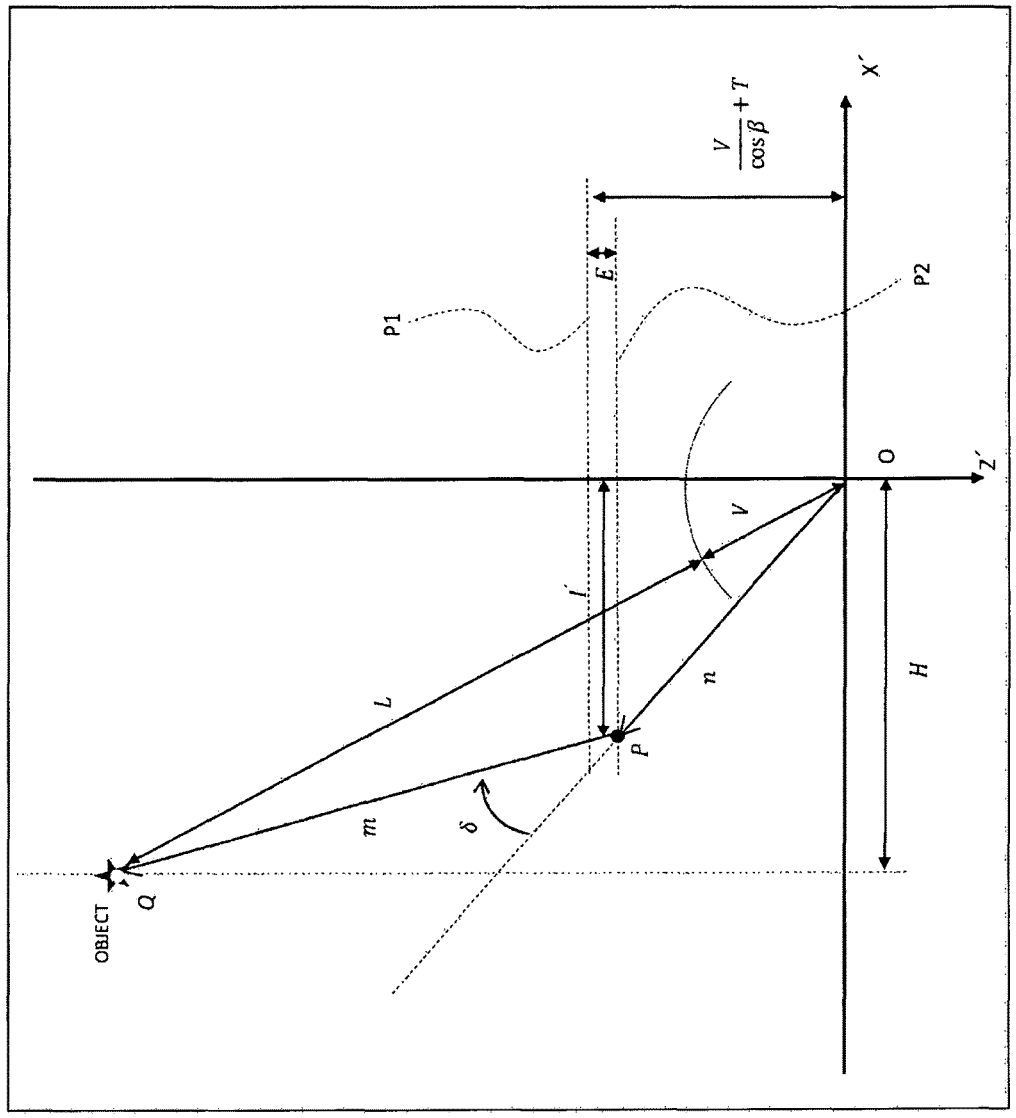
FIG. 11 is a diagram for explaining the process for deriving the approximation 4.

FIG. 11 is a diagram illustrating positional relation between a coordinate on the lens or a coordinate of an object on the reference plane S. In FIG. 11, an object is arranged at a point Q with a distance from the rotation center O of the right eyeball to the point Q of the object expressed as L+V. Here, L represents a distance from the object to a vertex on the concave surface of the lens and V represents a distance from the vertex on the concave surface of the lens to the rotation center O of the right eyeball. Considering a prismatic effect of the lens, the right eyeball converges when looking at the object existing at the point Q through the lens and a line of sight is directed toward a linear line n. At an intersection P between the linear line n and the concave surface of the lens (here, the spherical surface P2 approximating the concave surface), the direction of the line of sight is bended to a direction of a linear line m by a prismatic effect of the lens, thereby reaching the object. In other words, for looking at the object existing at the point Q, when the eyeball converges and the line of sight passes through the point P, the wearer can see the object. Therefore, the point P is on the main line of sight and a value of a coordinate of the X' axis direction of the point P is regarded as the inward inclination amount I'.

Here, when a prism amount is represented using I' and a deflection angle thereof is denoted as δ, tan δ can be expressed using the prism amount. Moreover, assuming a unit vector a of the linear line n, a unit vector b of the linear line m can be expressed as a vector where the unit vector a is rotated by δ, allowing for obtaining an inclination of the linear line m. Furthermore, the linear line m passes through the point P and the point Q and thus I' can be expressed by the above approximation 4.

Figure 12:
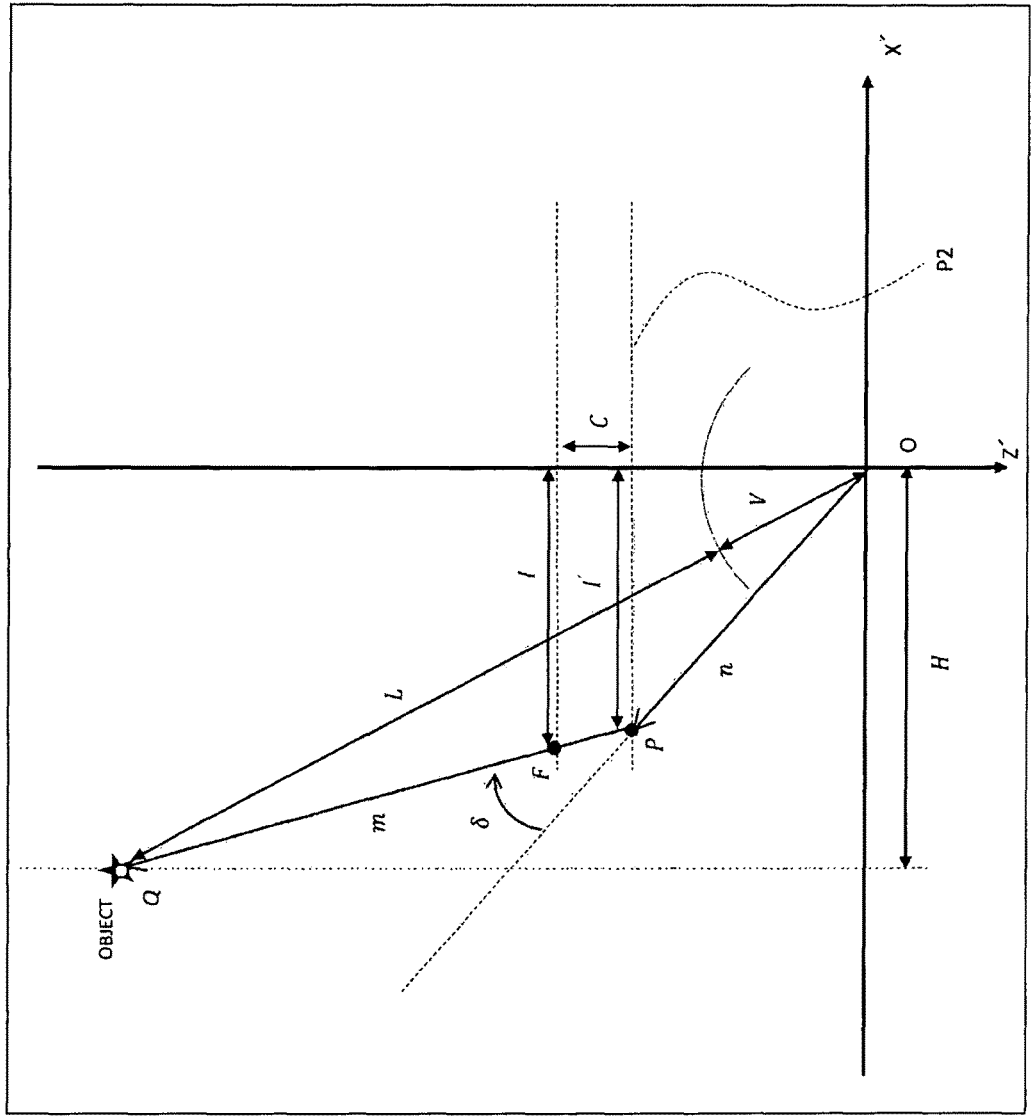
FIG. 12 is a diagram for explaining the process for deriving the approximation 4.

Incidentally, as illustrated in FIG. 12, an inward inclination amount I on a convex surface of the lens is obtained by correcting I' considering the thickness of the lens. Therefore, the inward inclination amount I on the convex surface of the lens can be expressed by the above approximation 3 considering the central thickness of the lens.

Also, when rotation of the eyeball in the vertical direction is not considered in the approximations 3 and 4, an equation cos β=1 holds while no curvature or inclination of the lens is considered an equation E=0 holds. Assigning these values to the approximations 3 and 4 allows for obtaining the approximations 1 and 2, respectively.

(5-2 Lens B)

In the above lens A, the case of distance vision using the lens A is also considered. Meanwhile, assuming a lens where the maximum value of object distance where clear vision can be obtained with distance vision is approximately several meters and not the infinite distance, the accommodative power margin may be exerted even with distance vision using an upper portion of the lens. In this case, a lens B, where convergence of the eye caused by the accommodative power margin is considered over the whole region from the upper portion to a lower portion of the lens, can be assumed. A main line of sight of this lens B is illustrated in FIG. 13.

Figure 13:
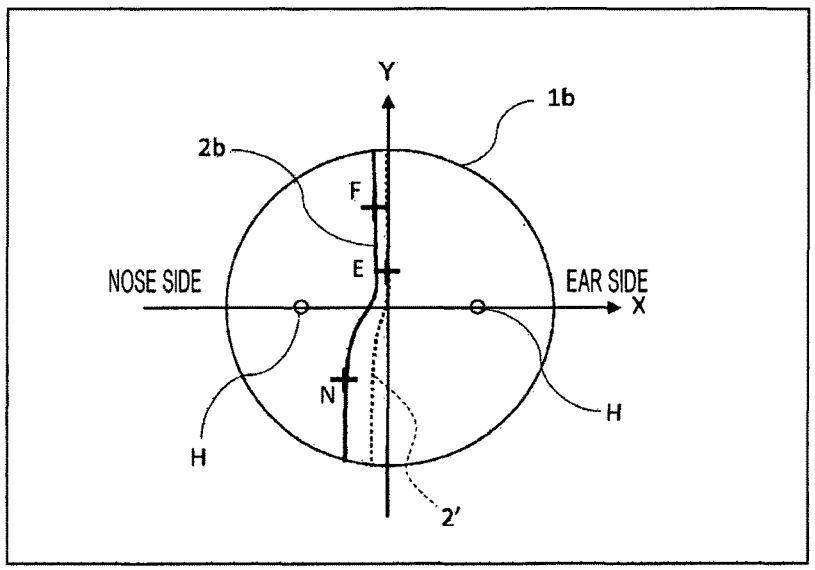
FIG. 13 is a plan schematic diagram of a progressive addition lens (lens B) of the present embodiment.

As apparent from FIG. 13, a final main line of sight 2b in the lens B (lens 1b) illustrated in FIG. 13 includes no common point with a vertical line (Y axis in FIG. 13) passing through a midpoint of a line connecting two hidden marks H and a shape thereof is not a linear line. Furthermore, the whole final main line of sight 2b is displaced toward a nose side from the vertical line. In such a lens, the accommodative power margin is considered over the whole region from an upper portion to a lower portion of the lens and thus the lens is suitable for an indoor type progressive addition lens of an occupational type with no need of looking at an infinite distance.

Incidentally, in progressive addition lenses of the occupational type of the related art, a main line of sight includes a common point with a vertical line thereof. This is because the progressive addition lenses of the occupational type of the related art are not based on the technical idea of determining a main line of sight considering the accommodative power margin and thus are designed based on a premise that the main line of sight and the vertical line includes a common point. Therefore, the progressive addition lens as the lens B cannot be conceived. In other words, the technical idea of shifting the whole main line of sight that is like a backbone of the lens toward the nose side from the vertical line cannot be reached without the premise of determining the main line of sight considering the accommodative power margin.

6. Effects of the Present Embodiment

In the progressive addition lenses used in the related art, convergence of the eye minimum required for near vision (convergence by the passive accommodative power) is considered; however, the main line of sight is determined with a premise that the accommodative power margin of a wearer is not exerted. However, even in a case where the progressive addition lens is necessary, the accommodative power remaining in the eye of the wearer is larger than the passive accommodative power. Thus, wearing the progressive addition lens as spectacles may result in a case where the accommodative power margin is exerted in addition to the passive accommodative power especially for looking at an object existing in the range from intermediate vision to near vision, thereby looking at an object closer than assumed in the design. In such a case, even more accommodative convergence occurs and the wearer looks at the object at a point closer to the nose side (inclined inward) than a point where a line of sight is assumed to pass for looking at the object in the design of the progressive addition lens (that is, a point on the main line of sight). In this case, the point where the wearer actually looks at the object is shifted from the main line of sight and thus there are cases where astigmatism becomes larger and the object appears with warping.

In the present embodiment, therefore, a main line of sight is determined considering convergence caused by the accommodative power margin. Specifically, each of the main line of sight, where exertion of the accommodative power margin to a maximum degree (first main line of sight) is considered, and the main line of sight, where the accommodative power margin (second main line of sight) is not considered, is calculated and then the final main line of sight existing between the first main line of sight and the second main line of sight is determined. Looking through a lens including the main line of sight determined in the above manner allows a lens point where an actual line of sight passes through to be the main line of sight or the vicinity thereof. Therefore, an object can be clearly seen over a distance range where clear vision is desired, thereby allowing for improving comfort of wearing.

Also, in the present embodiment, the minimum value of object distance (first object distance), where clear vision can be obtained with the whole accommodative power margin exerted, is calculated and the first main line of sight is calculated using this first object distance. This allows for calculating the first main line of sight where the accommodative power margin is appropriately considered.

Furthermore in the present embodiment, the final main line of sight is calculated considering a use frequency of a lens region corresponding to an object distance. Specifically, performing weighting on the first main line of sight and the second main line of sight reflecting the use frequency of a lens region corresponding to an object distance and synthesizing the first main line of sight and the second main line of sight allow for determining the final main line of sight according to a use state of the wearer.

The progressive addition lens including the main line of sight calculated by the method according to the present embodiment includes a larger inward inclination amount at a specific point on the lens as compared to the progressive addition lens of the related art. Therefore, even if accommodative convergence larger than assumed in the design of the related art occurs, an object can be clearly seen without warping through the lens. Especially, considering the accommodative power margin allows, for the first time, arranging the whole main line of sight toward the nose side from the vertical line in the progressive addition lens of the occupational type.

The present embodiment further calculates the accommodative power of the eye on the manufacturing side when information of the accommodative power of the eye of the wearer used for determining the main line of sight is not included in the information transmitted from the order placing side and determines the main line of sight using this. Therefore, even when the information of the accommodative power of the eye cannot be acquired from the order placing side, the main line of sight where the accommodative power margin is considered can be determined.

The embodiments of the present invention have been described in the above; however, the present invention is not limited to the aforementioned embodiments in any way but may include various modifications within a scope not departing from the principals of the present invention.

Examples

Hereinafter, the present invention will be described with further detailed examples; however, the present invention is not limited to these examples.

In a first example and a second example below, a progressive addition lens was designed based on lens design information illustrated in Table 2. Furthermore, two hidden marks are formed on a horizontal line passing through the center of the lens.

TABLE 2

| | FIRST EXAMPLE | SECOND EXAMPLE |
| --- | --- | --- |
| PROGRESSIVE TYPE | BIFOCAL TYPE | INDOOR TYPE |
| PRESCRIBED S (D) | 0.00 | 0.00 |
| PRESCRIBED ADD (D) | 1.50 | 1.50 |
| PRESCRIBED PRISM AMOUNT (PD) | 0.00 | 0.00 |
| PRESCRIBED PRISM DIRECTION (DEGREE) | 0 | 0 |
| LENS S (D) | 0.00 | 0.50 |
| LENS ADD (D) | 1.50 | 1.00 |
| LENS PRISM AMOUNT (PD) | 0.75 | 0.50 |
| LENS PRISM DIRECTION (DEGREE) | 270 | 270 |
| CENTER THICKNESS (mm) | 2.20 | 2.20 |
| FORWARD TILTING ANGLE (DEGREE) | 0 | 0 |
| CURVATURE OF APPROXIMATION SPHERICAL SURFACE OF LENS BACK SURFACE [D] | 2.20 | 2.20 |
| REFRACTIVE INDEX OF LENS MATERIAL | 1.60 | 1.60 |
| DISTANCE OBJECT POWER (D) | 0.00 | 1.00 |
| NEAR OBJECT POWER (D) | 2.50 | 2.50 |
| DISTANCE REFERENCE POINT IN Y DIRECTION (mm) | 8 | 14 |
| NEAR REFERENCE POINT IN Y DIRECTION (mm) | −14 | −17.5 |
| VR (mm) | 29 | 29 |
| PD (mm) | 60 | 60 |
| FITTING POINT (mm) | 4 | 4 |
| REMAINING ACCOMMODATIVE POWER (D) | 1.50 | 1.50 |

First Example

Figure 14:
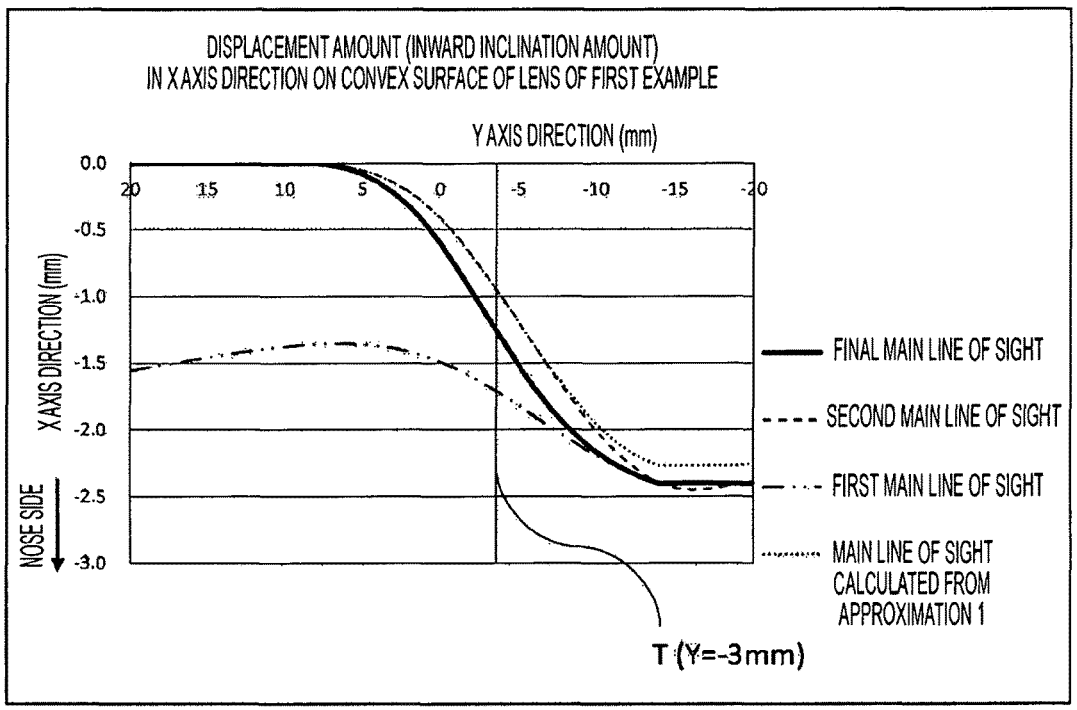
FIG. 14 is a diagram illustrating displacement amounts in an X axis direction of respective main lines of sight calculated in the first example.

Based on the lens design information of the first example illustrated in Table 2, first, an object distance where the accommodative power margin (second object distance) was considered was set using a known light beam tracing method, thereby calculated a main line of sight (second main line of sight) on a convex surface of the lens. Variations in object power (reciprocal of object distance) on the second main line of sight are illustrated in FIG. 6. A displacement amount in the horizontal direction (X axis direction) from a vertical line (Y axis) passing through a midpoint of a line connecting the two hidden marks is illustrated in FIG. 14. Incidentally, in FIG. 14, a negative side in the X axis direction represents a nose side while a positive side represents an ear side.

Also, a main line of sight calculated using the aforementioned approximation 1 without considering the accommodative power margin is illustrated in FIG. 14.

Next, an object distance was calculated at each point on the second main line of sight considering the accommodative power margin, thereby calculated the first object distance. Based on this first object distance, the first main line of sight was further calculated. Variations in object power of the first object distance (reciprocal of the first object distance) on the first main line of sight are illustrated in FIG. 6. A displacement amount in the horizontal direction (X axis direction) from the vertical line (Y axis) passing through the midpoint of the line connecting the two hidden marks is illustrated in FIG. 14.

Incidentally, according to the lens design information illustrated in Table 2, the object power (near object power) at a near reference point (Y=−14 mm) is 2.5 D, which means that a wearer prefers a lens allowing for clear vision of objects at a position 40 cm apart in near vision. Meanwhile, a power of the lens at the near reference point corresponds to an addition power, which is 1.5 D. Thus at this lens point the wearer is assumed to exert an accommodative power of 1.0 D. However, the maximum accommodative power of the wearer is 1.5 D and thus if the accommodative power margin (0.5 D) is exerted to a maximum degree in addition to the assumed accommodative power (passive accommodative power (1.0 D)) (1.5 D), clear vision can be obtained at the maximum object power of 3.0 D with the addition power of the lens (1.5 D) added, that is, at a position 33 cm apart. As described above, when the object power is set according to preference of the wearer, since an object power of 3.0 D is larger than the object power (2.5 D) preferred by the wearer, this may result in over performance. In the present example, therefore, the sum of the object power attributable to exerting the accommodative power and the addition power of the lens was set to be less than the near object power. That is, in the present example, the maximum value of object power, where the accommodative power margin was considered, was adjusted to be equivalent to 2.5 D. The adjustment is performed such that continuity of object power on the main line of sight is maintained. Specifically, the adjustment was performed such that continuity to a first-order differential of the object power is maintained.

Figure 15:
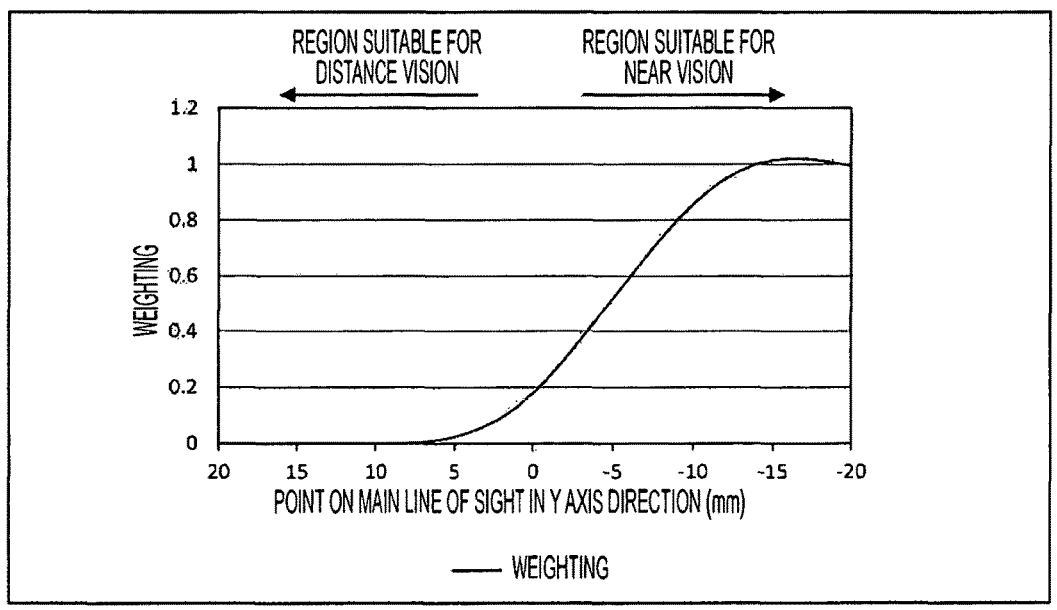
FIG. 15 is a diagram where variations in addition power are used as a weighting function in the first example.

Thereafter, as the weighting function for determining a main line of sight from the first main line of sight and the second main line of sight, a change ratio of addition power on the second main line of sight illustrated in FIG. 15 was used. With this weighting function, the first main line of sight and the second main line of sight were synthesized and a final main line of sight was determined. The determined final main line of sight exists between the first main line of sight and the second main line of sight as illustrated in FIG. 14, substantially corresponds to the second main line of sight up to the vicinity of the distance reference point in a Y direction, and is displaced toward a negative side (nose side) in an X direction from the second main line of sight and thus approaches the first main line of sight from the vicinity of the distance reference point to the vicinity of the near reference point. Thereafter from the vicinity of the near reference point and a lower portion therefrom, the final main line of sight substantially corresponds to the first main line of sight. That is, in a lens region often used for intermediate vision and near vision, the main line of sight was confirmed to be displaced toward the nose side.

Moreover, comparing the main line of sight calculated using the approximation 1 and the second main line of sight, they do not correspond to each other from the vicinity of the near reference point (Y=−14 mm) and a lower portion therefrom. However on a line T, passing through a midpoint of a line connecting a distance reference point (Y=+8 mm) and a near reference point (Y=−14 mm), parallel to a line connecting the two hidden marks, the main line of sight calculated using the approximation 1 and the second main line of sight substantially correspond to each other. Therefore, substantially high accuracy of the approximation 1 was confirmed.

Furthermore on the line T, an inward inclination amount of the final main line of sight in the X axis direction (displacement amount toward the nose side) was confirmed to be larger than an inward inclination amount of the main line of sight calculated using the approximation 1 and the second main line of sight in the X axis direction.

Figure 16:
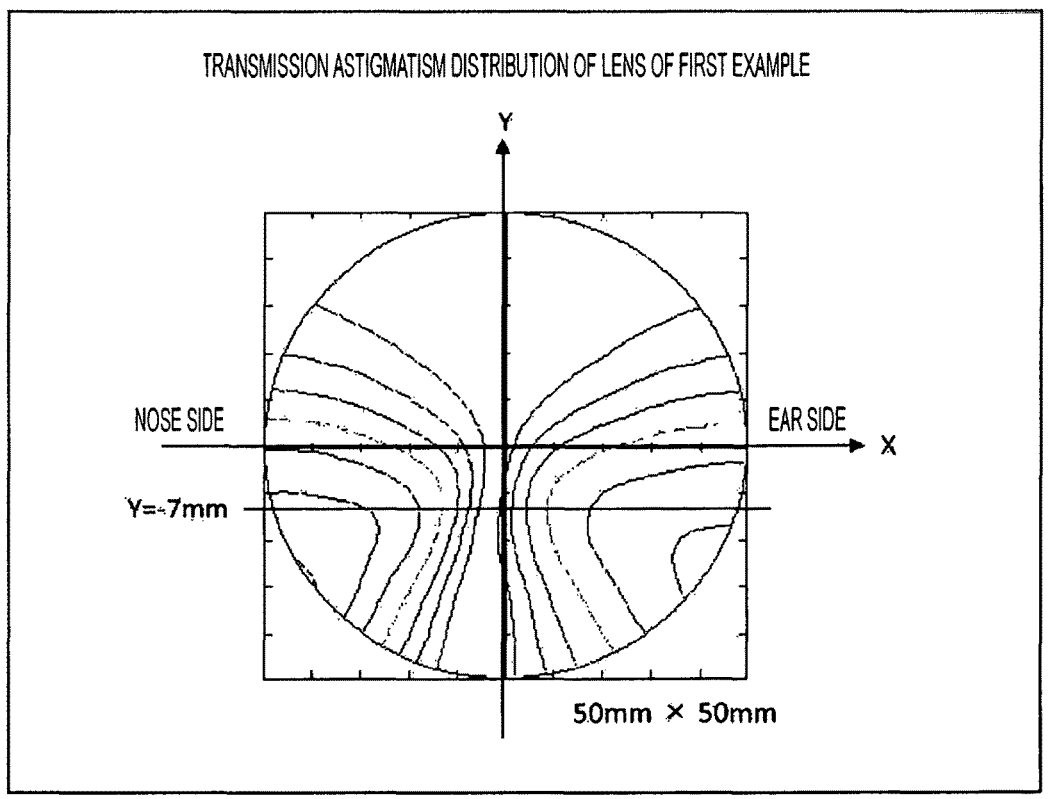
FIG. 16 is a transmission astigmatism distribution of a progressive addition lens designed based on the final main line of sight calculated in the first example.

Thereafter, a progressive addition lens was designed based on a shape of the final main line of sight of the first example and a transmission astigmatism distribution of the lens was calculated. The obtained transmission astigmatism distribution is illustrated in FIG. 16. Also in FIG. 17, variations in astigmatism in the horizontal direction at a point of Y=−7 mm is illustrated with regard to the progressive addition lens designed based on the shape of the final main line of sight of the first example and a progressive addition lens designed based on the shape of the second main line of sight, where the accommodative power margin is considered, of the first example.

Figure 17:
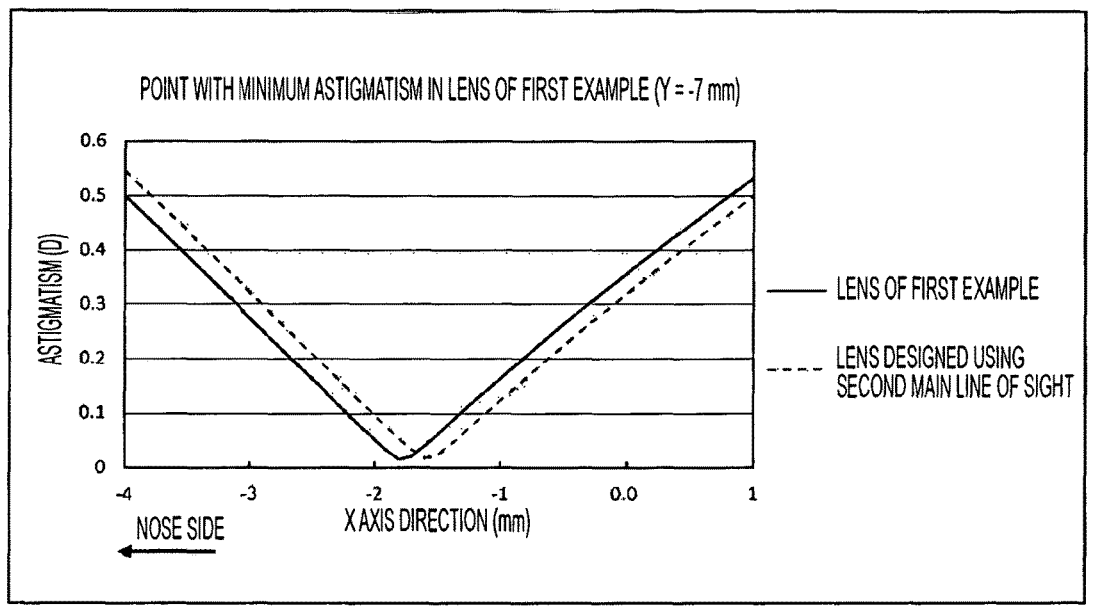
FIG. 17 is a diagram illustrating astigmatism at Y=−7 mm in FIG. 16 in the first example.

From FIG. 17, a point where astigmatism is the smallest is confirmed to have shifted toward the nose side in the progressive addition lens designed based on the shape of the final main line of sight of the first example, where exertion of the accommodative power margin to a maximum degree is considered, as compared to the progressive addition lens designed based on the shape of the second main line of sight, that is a main line of sight where the accommodative power margin is not considered.

Therefore, with the progressive addition lens designed based on the shape of the final main line of sight of the first example, a main line of sight can be arranged in the vicinity of a position of a line of sight corresponding to actual usage of the wearer, thereby allowing for implementing comfortable distance vision and near vision without warping or the like of objects seen through the lens.

Second Example

Figure 18:
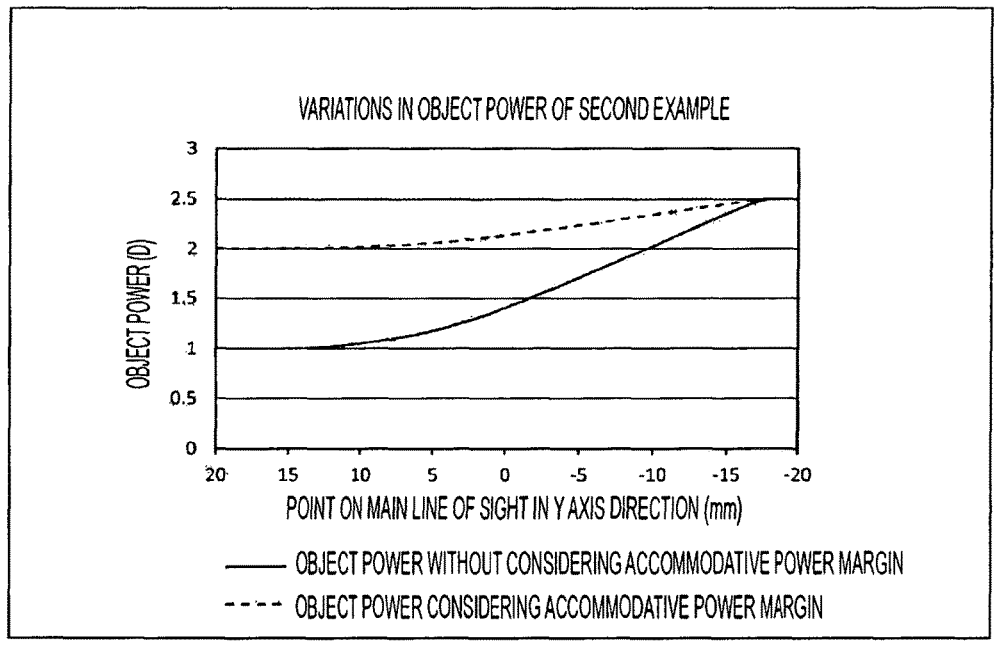
FIG. 18 is a diagram illustrating an object power on a main line of sight in a second example.

Based on the lens design information of a second example illustrated in Table 2, first, an object distance, where the accommodative power margin (second object distance) was not considered, was set using a known light beam tracing method, thereby calculated a main line of sight (second main line of sight) on a convex surface of the lens. Variations in object power (reciprocal of object distance) on the second main line of sight are illustrated in FIG. 18. A displacement amount in the horizontal direction (X axis direction) from a vertical line (Y axis) passing through a midpoint of a line connecting the two hidden marks is illustrated in FIG. 19.

Figure 19:
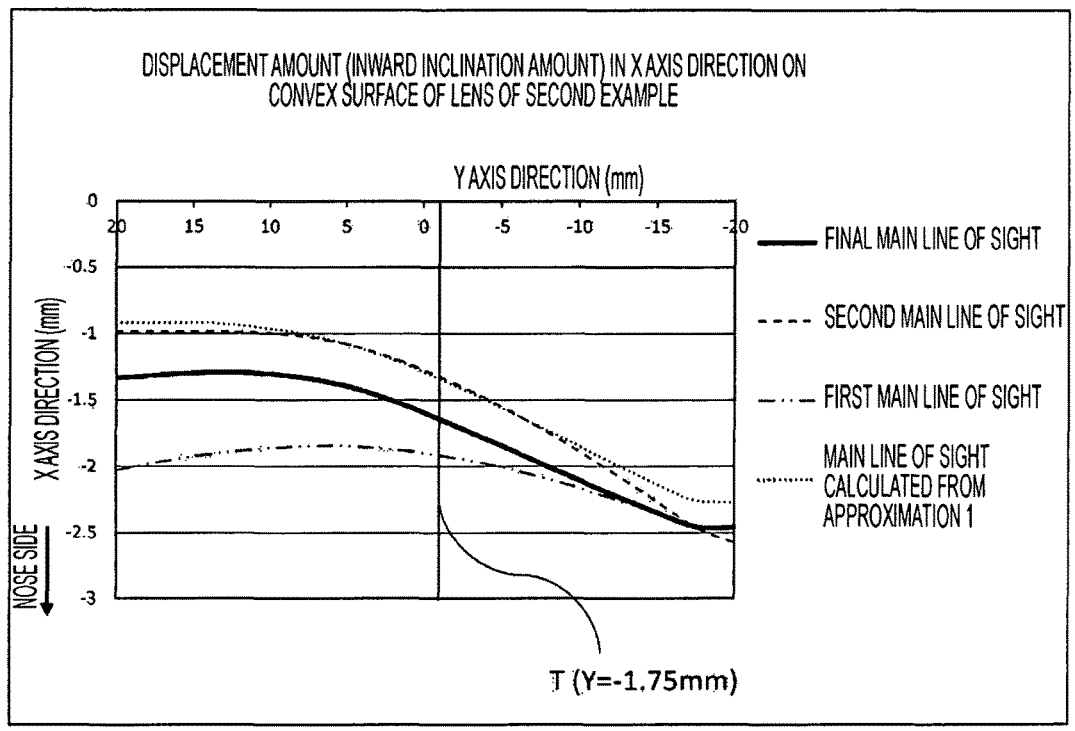
FIG. 19 is a diagram illustrating displacement amounts in an X axis direction of respective main lines of sight calculated in the second example.

Incidentally, in FIG. 19, a negative side in the X axis direction represents a nose side while a positive side represents an ear side.

Also, a main line of sight calculated using the aforementioned approximation 1 without considering the accommodative power margin is illustrated in FIG. 19.

Next, an object distance was calculated at each point on the second main line of sight considering the accommodative power margin, thereby calculated the first object distance. Based on this first object distance, the first main line of sight was further calculated. Variations in object power of the first object distance (reciprocal of the first object distance) on the first main line of sight are illustrated in FIG. 18. A displacement amount in the horizontal direction (X axis direction) from the vertical line (Y axis) passing through the midpoint of the line connecting the two hidden marks is illustrated in FIG. 19.

Incidentally, a progressive addition lens of the second example is for indoor use and thus an object power at a distance reference point does not need to be 0 (object distance of infinite distance) but can be 1.0 D (object distance of 1 m). Therefore, by adding a distance power of 0.5 D in advance, prescription is made such that a half of the necessary accommodative power with respect to the object power is complemented by the lens. Therefore, since a power of the lens at the distance reference point is 0.5 D, at this lens point the wearer is assumed to exert an accommodative power of 0.5 D.

Meanwhile, since the object power (near object power) at a near reference point (Y=−17.5 mm) is 2.5 D, like in the first example, this means that the wearer prefers a lens allowing for clear vision at a position 40 cm in near vision.

A power of the lens at the near reference point corresponds to the sum of the distance power and an addition power, which is 1.5 D. Thus at this lens point the wearer is assumed to exert an accommodative power of 1.0 D. However, since the maximum accommodative power of the wearer is 1.5 D, like in the first example, exerting the accommodative power margin to a maximum degree results in the object power of 3.0 D. Therefore like in the first example, the maximum value of object power considering the accommodative power margin was adjusted to be equivalent to 2.5 D.

Figure 20:
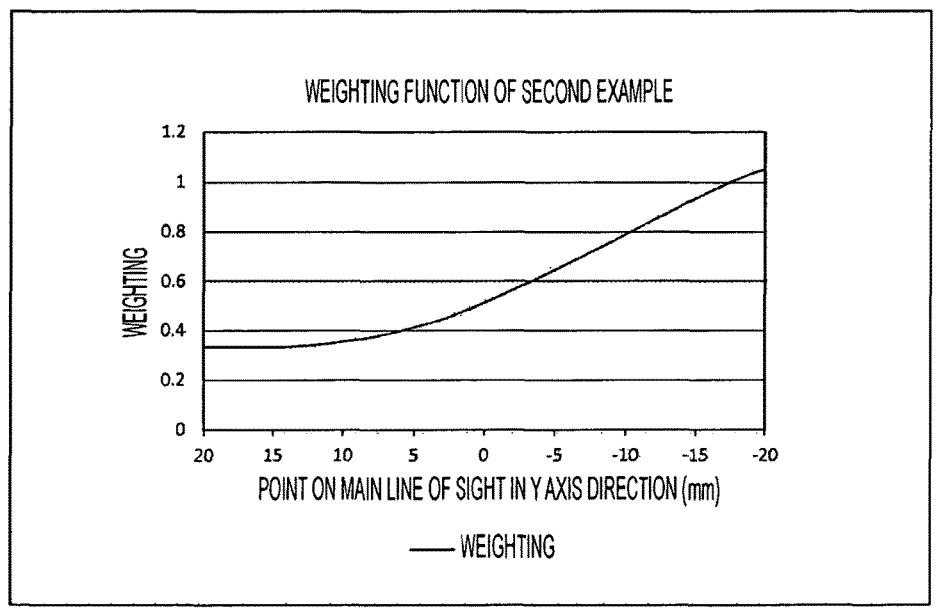
FIG. 20 is a diagram where variations in addition power are used as a weighting function in the second example.

Thereafter, as the weighting function for determining a final main line of sight from the first main line of sight and the second main line of sight, a change ratio of addition power on the second main line of sight illustrated in FIG. 20 was used. With this weighting function, the first main line of sight and the second main line of sight were synthesized and a final main line of sight was determined. The determined final main line of sight is illustrated in FIG. 19.

FIG. 19 illustrates that the final main line of sight exists between the first main line of sight and the second main line of sight like in the first example and is displaced toward a negative side (nose side) in an X direction from the second main line of sight as the final main line of sight passes a negative side in a Y axis direction and thus approaches the first main line of sight. Thereafter from the vicinity of Y=−10 mm and a lower portion therefrom, the final main line of sight substantially corresponds to the first main line of sight. That is, over the entire lens region, the final main line of sight was confirmed to have displaced (inclined inward) toward the nose side from the vertical line (Y axis) passing through the midpoint of the line connecting the two hidden marks. The progressive addition lens of the second example is for indoor use and thus only a distance of approximately 1 m is assumed as the maximum distance for distance vision. In this case, there is a possibility that the accommodative power margin is exerted over the entire lens. Therefore the final main line of sight has a shape where exertion of the accommodative power margin over the upper portion to the lower portion of the lens is considered.

Moreover, comparing the main line of sight calculated using the approximation 1 and the second main line of sight, they tend not to correspond to each other from the vicinity of the distance reference point (Y=+14 mm) to an upper portion therefrom and from Y=−5 mm to a lower portion therefrom. However on a line T, passing through a midpoint of a line connecting a distance reference point (Y=+14 mm) and a near reference point (Y=−17.5 mm), parallel to a line connecting the two hidden marks, the main line of sight calculated using the approximation 1 and the second main line of sight substantially correspond to each other. Therefore, substantially high accuracy of the approximation 1 was confirmed.

Furthermore on the line T, an inward inclination amount of the final main line of sight in the X axis direction (displacement amount toward the nose side) was confirmed to be larger than an inward inclination amount of the main line of sight calculated using the approximation 1 and the second main line of sight in the X axis direction.

Figure 21:
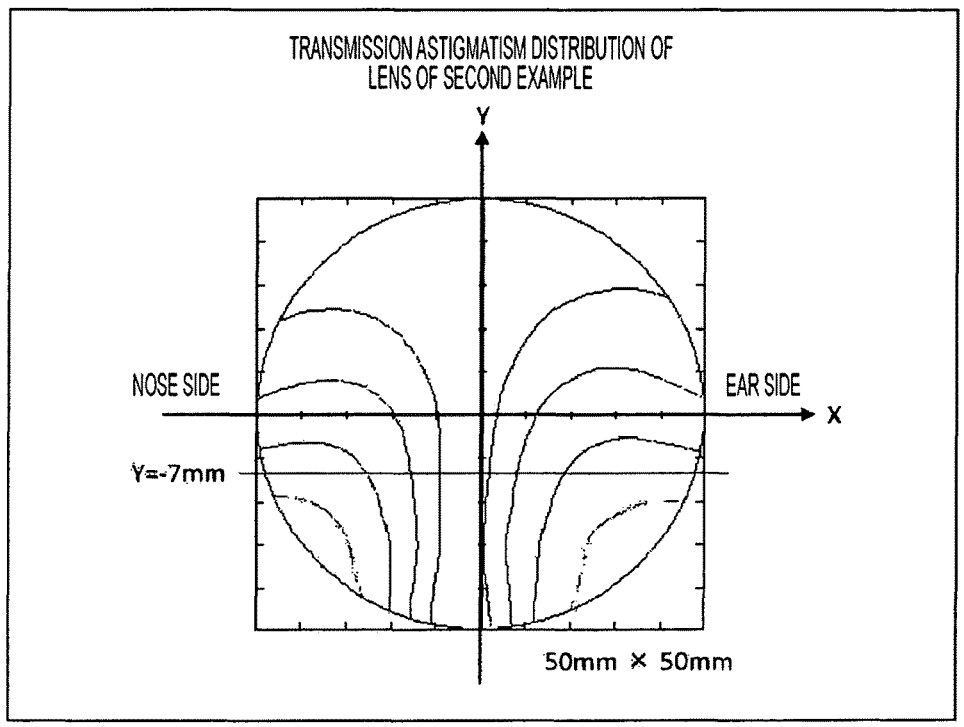
FIG. 21 is a transmission astigmatism distribution of a progressive addition lens designed based on the final main line of sight calculated in the second example.

Thereafter, a progressive addition lens was designed based on a shape of the final main line of sight of the second example and a transmission astigmatism distribution of the lens was calculated. The obtained transmission astigmatism distribution is illustrated in FIG. 21. Also in FIG. 22, variations in astigmatism in the horizontal direction at a point of Y=−7 mm is illustrated with regard to the progressive addition lens designed based on the shape of the final main line of sight of the second example and a progressive addition lens designed based on the shape of the second main line of sight of the second example where the accommodative power is not considered.

Figure 22:
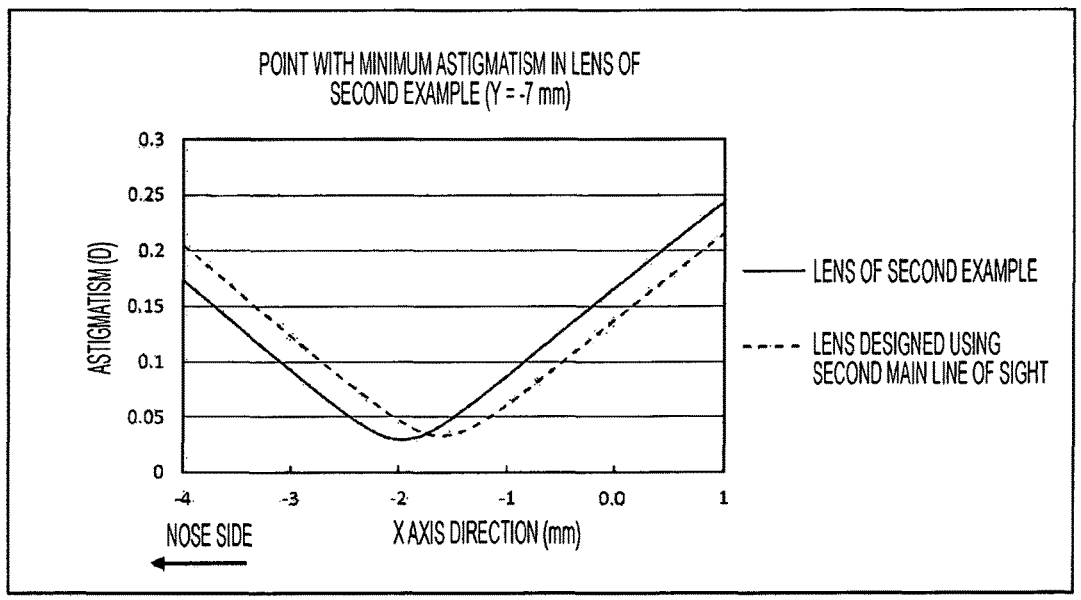
FIG. 22 is a diagram illustrating astigmatism at Y=−7 mm in FIG. 21 in the second example.

From FIG. 22, a point where astigmatism is the smallest is confirmed to have shifted toward the nose side in the progressive addition lens designed based on the shape of the final main line of sight of the second example, where the accommodative power margin is considered as compared to the progressive addition lens designed based on the shape of the second main line of sight, that is a main line of sight where the accommodative power margin is not considered.

Therefore, with the progressive addition lens designed based on the shape of the final main line of sight of the second example, a main line of sight can be arranged in the vicinity of a position of a line of sight corresponding to actual usage of the wearer, thereby allowing for implementing comfortable intermediate vision and near vision without warping or the like of objects seen through the lens.

Furthermore, by comparing the second main line of sight, the main line of sight calculated using the approximation 1, and the main line of sight calculated using the approximation 3, levels of errors between the second main line of sight and the approximations 1 and 3 were estimated. The main line of sight calculated using the approximation 1, the main line of sight calculated using the approximation 3, and the second main line of sight in the first and the second examples are illustrated in FIG. 23.

Figure 23:
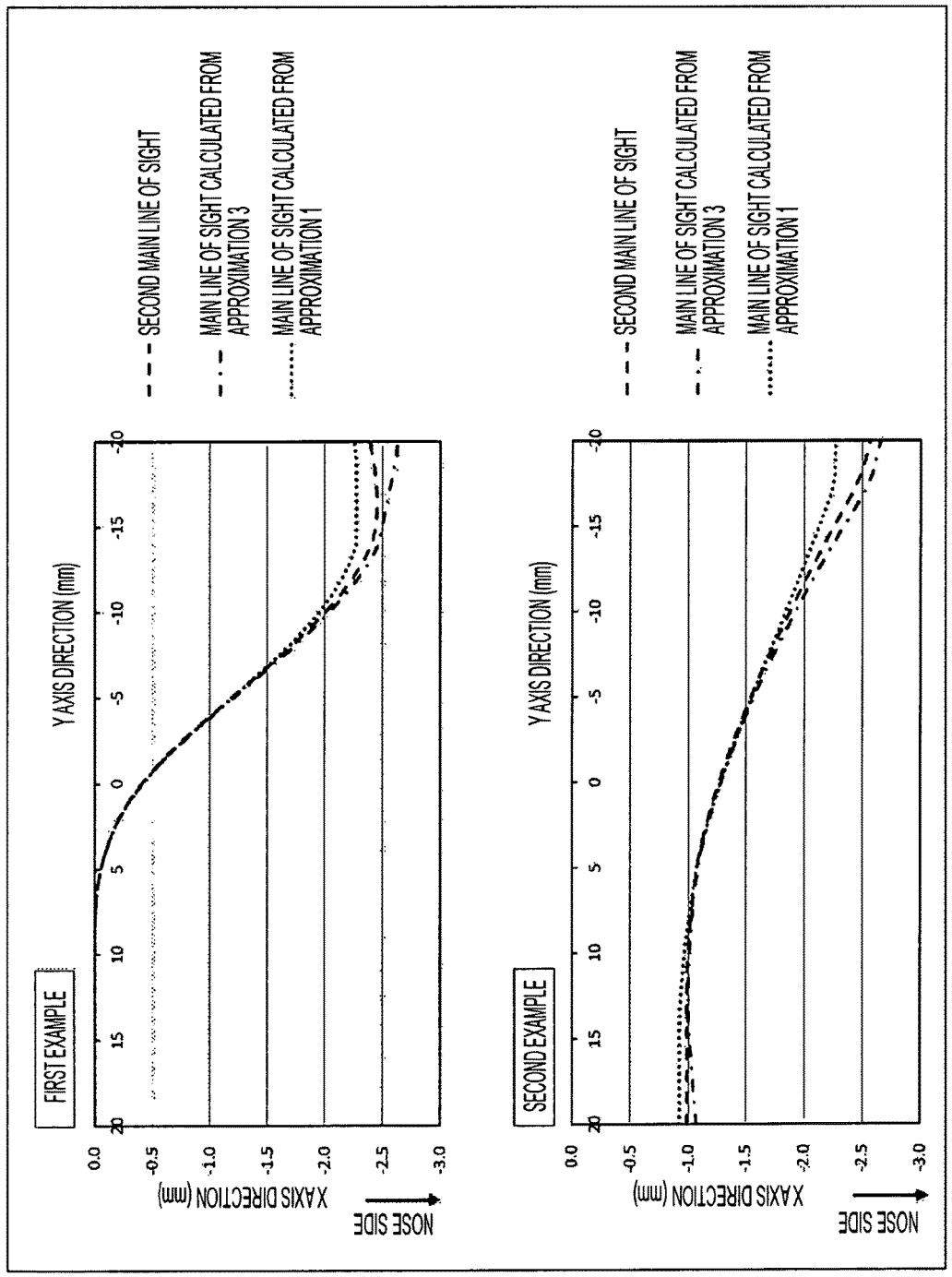
FIG. 23 is a diagram illustrating displacement amounts in the X axis direction of a second main line of sight, a main line of sight calculated using an approximation 1, and a main line of sight calculated using an approximation 3 in the first and the second examples.

From FIG. 23, the main line of sight calculated using the approximation 3 can be confirmed to have a tendency of corresponding to the second main line of sight than the main line of sight calculated using the approximation 1, and the approximation 3 can be confirmed to have a higher accuracy than the approximation 1. However in the vicinity of the midpoint between the distance reference point and the near reference point, either of the case of using the approximation 1 or the case of using the approximation 3 substantially corresponded to the second main line of sight, thereby allowed for confirming a substantially high accuracy.

REFERENCE SIGNS LIST 1a, 1b: Progressive addition lens
2a, 2b: Main line of sight
10: Progressive addition lens manufacturing system
12: Order placing device
13: Manufacturing side device

The invention claimed is:

1. A design method of a progressive addition lens, the method comprising:
   a first main line of sight calculation step of calculating a first main line of sight, where accommodative convergence caused by use of an accommodative power margin of an eye is considered, based on lens design information including at least information of accommodative power of the eye of a wearer;
   a second main line of sight calculation step of calculating a second main line of sight, where the accommodative power margin is not considered, based on the lens design information; and
   a final main line of sight determination step of determining a final main line of sight of a lens from the first main line of sight, the final main line of sight being determined from the first main line of sight and the second main line of sight.

2. The design method of a progressive addition lens according to claim 1, the method further comprising a first object distance calculation step of calculating, as a first object distance, a minimum value of object distance where clear vision can be obtained with the whole accommodative power margin of the eye is exerted at each point on the second main line of sight,
   wherein, in the first main line of sight calculation step, the first main line of sight is calculated using the first object distance instead of a second object distance used for calculating the second main line of sight.

3. The design method of a progressive addition lens according to claim 1, wherein, in the final main line of sight determination step, the final main line of sight is determined by performing weighting on the first main line of sight and the second main line of sight and synthesizing the first main line of sight and the second main line of sight.

4. The design method of a progressive addition lens according to claim 3, wherein the weighting is performed based on variations of refractive power of the lens on the second main line of sight.

5. The design method of a progressive addition lens according to claim 2, wherein a minimum value of the first object distance is adjusted such that the minimum value corresponds to a reference object distance when the minimum value of the first object distance of the first object distances calculated for respective points on the second main line of sight is smaller than the reference object distance set to the lens.

6. A manufacturing method of a progressive addition lens of designing and manufacturing a progressive addition lens based on lens design information for designing the progressive addition lens, the method comprising:
   a lens design information acquisition step where a manufacturing side device arranged on a manufacturing side of the progressive addition lens acquires the lens design information transmitted from an order placing device arranged on an order placing side of the progressive addition lens;
   a lens design step of designing the progressive addition lens based on the lens design information using the design method of a progressive addition lens according to claim 1; and
   a lens manufacturing step of manufacturing the progressive addition lens based on design data acquired in the lens design step.

7. The manufacturing method of a progressive addition lens according to claim 6, wherein the manufacturing side device calculates the accommodative power of the eye from information other than information of the accommodative power of the eye included in the lens design information when the information of the accommodative power of the eye of the wearer is not included in the acquired lens design information and designs the progressive addition lens based on the calculated accommodative power of the eye and the lens design information.

8. A progressive addition lens manufacturing system where an order placing device arranged on an order placing side of a progressive addition lens and a manufacturing side device arranged on a manufacturing side of the progressive addition lens are connected via a communication channel,
   wherein the order placing device comprises a data transmission section to transmit, as data, lens design information for designing the progressive addition lens,
   the manufacturing side device comprises a computer section and a data acquisition section to acquire the lens design information as the data, and
   the computer section comprises:
      a first main line of sight calculation section to calculate a first main line of sight, where accommodative convergence caused by use of an accommodative power margin of an eye of a wearer is considered, based on the lens design information acquired by the data acquisition section;
      a second main line of sight calculation step of calculating a second main line of sight, where the accommodative power margin is not considered, based on the lens design information; and
      a final main line of sight determination section to determine a final main line of sight of the lens from the first main line of sight, the final main line of sight being determined from the first main line of sight and the second main line of sight.

9. The progressive addition lens manufacturing system according to claim 8, wherein the computer section further comprises an accommodative power calculation section to calculate accommodative power of the eye of the wearer,
   the accommodative power calculation section calculates the accommodative power of the eye from information other than information of the accommodative power of the eye included in the lens design information when the information of the accommodative power of the eye is not included in the lens design information, and
   the final main line of sight is determined from the first main line of sight calculated based on information of the calculated accommodative power of the eye and the lens design information.

10. A progressive addition lens formed with two hidden marks for determining a predetermined reference point on the lens, wherein, assuming a vertical line passing through a midpoint of a line connecting the two hidden marks and extending in a vertical direction of the progressive addition lens, an entire main line of sight, on a convex surface and a concave surface of the progressive addition lens, exists on a nose side with respect to the vertical line, the main line of sight and the vertical line share no common point, and a shape of the main line of sight is not linear.

11. A progressive addition lens formed with two hidden marks for determining a predetermined reference point on the lens, wherein, on a convex surface of the progressive addition lens, an inward inclination amount, of the main line of sight of the progressive addition lens, on a linear line T passing through a midpoint of a line connecting a distance reference point and a near reference point defined for the progressive addition lens and parallel to a line connecting the two hidden marks, is larger than an inward inclination amount I on the linear line T calculated from the following formula 1, and a shape of the main line of sight is not linear, where, letters W, H, V, D, C, and K in the following formula 1 represent, respectively, a reciprocal of a target distance, a PD of one of the eyes, a distance between a back vertex of the progressive addition lens and a rotation point of the eyeball, a power of a horizontal cross section of the progressive addition lens, a central thickness of the progressive addition lens, and a parameter expressed by the following formula 2;

[Mathematical Formula 1]

$$I = -\frac{WHV}{(1000 - VD) + WV}\left(1 - \frac{C}{K}\right) \quad \text{Formula 1}$$

[Mathematical Formula 2]

$$K = \frac{V}{-1 + \frac{VD}{1000}}. \quad \text{Formula 2}$$

12. A progressive addition lens formed with two hidden marks for determining a predetermined reference point on the lens, wherein, on a concave surface of the progressive addition lens, an inward inclination amount, of the main line of sight of the progressive addition lens, on a linear line T passing through a midpoint of a line connecting a distance reference point and a near reference point defined for the progressive addition lens and parallel to a line connecting the two hidden marks, is larger than an inward inclination amount I on the linear line T calculated from the following formula 3, and a shape of the main line of sight is not linear, where, letters W, H, V, and D in the following formula 3 represent, respectively, a reciprocal of a target distance, a PD of one of the eyes, a distance between a back vertex of the progressive addition lens and a rotation point of the eyeball, and a power of a horizontal cross section of the progressive addition lens;

[Mathematical Formula 3]

$$I' = -\frac{WHV}{(1000 - VD) + WV}. \quad \text{Formula 3}$$

* * * * *